(12) United States Patent
Liu et al.

(10) Patent No.: US 7,947,800 B2
(45) Date of Patent: May 24, 2011

(54) POLY(ARYL ETHER) WITH PENDENT SULFONIC ACID PHENYL GROUPS

(75) Inventors: Baijun Liu, Boucherville (CA); Michael D. Guiver, Ottawa (CA); Gilles P. Robertson, Gatineau (CA)

(73) Assignee: National Research Council of Canada, Ottawa, Ont.

( * ) Notice: Subject to any disclaimer, the term of this patent is extended or adjusted under 35 U.S.C. 154(b) by 147 days.

(21) Appl. No.: 12/309,359

(22) PCT Filed: Jul. 13, 2007

(86) PCT No.: PCT/CA2007/001229
§ 371 (c)(1),
(2), (4) Date: Jan. 15, 2009

(87) PCT Pub. No.: WO2008/009102
PCT Pub. Date: Jan. 24, 2008

(65) Prior Publication Data
US 2009/0203806 A1    Aug. 13, 2009

Related U.S. Application Data

(60) Provisional application No. 60/832,130, filed on Jul. 21, 2006.

(51) Int. Cl.
*C08G 8/02* (2006.01)
(52) U.S. Cl. ........ 528/125; 528/171; 528/295; 528/220; 528/373; 521/27
(58) Field of Classification Search .................. 528/125, 528/171, 295, 220, 373; 521/27
See application file for complete search history.

(56) References Cited

U.S. PATENT DOCUMENTS 5,080,698 A   1/1992   Krizan
6,969,755 B2  11/2005  Charnock et al.

FOREIGN PATENT DOCUMENTS

JP    2002-220530        8/2002
JP    2002-226575        8/2002
WO    WO 2004/079844 A1  9/2004

OTHER PUBLICATIONS

Steele, B. C. H.; Heinzel, A., Materials for fuel-cell technologies, Nature 2001, 414, 345.
Rikukawa, M.; Sanui, K., Proton-conducting polymer electrolyte membranes based on hydrocarbon polymers, Prog. Polym. Sci. 2000, 25, 1463.
Hickner, M. A.; Ghassemi, H.; Kim, Y. S.; Einsla, B. R.; McGrath, J. E., Alternative Polymer Systems for Proton Exchange Membranes (PEMs), Chem. Rev. 2004, 104, 4587.
Roziere, J.; Jones, D. J. Ann., Non-Fluorinated Polymermaterials for Proton Exchangemembrane Fuel Cells, Rev. Mater. Res. 2003, 33, 503.

(Continued)

*Primary Examiner* — Randy Gulakowski
*Assistant Examiner* — Shane Fang
(74) *Attorney, Agent, or Firm* — Hans Koenig

(57) ABSTRACT

A sulfonated poly(aryl ether) (SPAE) having a poly(aryl ether) (PAE) main chain and a sulfonated phenyl group pendent from the main chain are useful in proton exchange membranes (PEMs), particularly for fuel cells. The pendent phenyl group can provide an easily sulfonable site that may be sulfonated under mild conditions, providing the ability to precisely control the sulfonic acid content of the SPAE.

12 Claims, 13 Drawing Sheets

OTHER PUBLICATIONS

Wang, F.; Hickner, M.; Kim, Y. S.; Zawodzinski, T. A.; McGrath, J. E., Direct polymerization of sulfonated poly(arylene ether sulfone) random . . . J. Membr. Sci. 2002, 197, 231.

Yang, Y.; Holdcroft, S., Synthetic strategies for controlling the morphology of proton conducting polymer membranes, Fuel Cells 2005, 5, 171.

Kerres, J. A., Development of ionomer membranes for fuel cells, J. Membr. Sci. 2001, 185, 3.

Nolte, R.; Ledjeff, K.; Bauer, M.; Mulhaupt, R., Partially sulfonated poly(arylene ether sulfone)—A versatile proton conducting membrane . . . J. Membr. Sci. 1993, 83, 211.

Miyatake, K.; Chikashige, Y.; Watanabe, M., Synthesis and Properties of Novel Sulfonated Arylene Ether/Fluorinated Alkane Copolymers, Macromolecules 2003, 36, 9691.

Fang, J. H.; Guo, X. X.; Harada, S.; Watari, T.; Tanaka, K.; Kita, H.; Okamoto, K., Novel Sulfonated Polyimides as Polyelectrolytes for Fuel . . . , Macromolecules 2002, 35, 9022.

Miyatake, K.; Asano, N.; Watanabe, M., Synthesis and Properties of Novel Sulfonated Polyimides Containing . . . , J. Polym. Sci., Part: A Polym. Chem. 2003, 41, 3901.

Genies, C.; Mercier, R.; Sillion, B.; Comet, N.; Gebel, G.; Pineri, M., Soluble sulfonated naphthalenic polyimides as materials for proton exchange . . . , Polymer 2001, 42, 359.

Powers, E. J.; Serad, G. A, History and Development of Polybenzimidazoles, High Performance Polymers: Their Origin and Development; Elsevier: Amsterdam, 1986; p. 355.

Wang, L.; Meng, Y. Z.; Wang, S. J.; Shang, X. Y.; Li, L.; Hay, A. S., Synthesis and Sulfonation of Poly(aryl ethers) Containing Triphenyl . . . , Macromolecules, 2004, 37, 3151.

Miyatake, K.; Oyaizu, K.; Tsuchida, E.; Hay, A. S., Synthesis and Properties of Novel Sulfonated Arylene Ether/Fluorinated Alkane Copolymers, Macromolecules, 2001, 34, 2065.

Kobayashi, T.; Rikukawa, M.; Sanui, K.; Ogata, N., Proton-conducting polymers derived from poly(ether-etherketone) and poly . . . , Solid State Ionics 1998, 106, 219.

Ghassemi, H.; McGrath, J. E., Synthesis and properties of new sulfonated poly (p-phenylene) derivatives for proton exchange membranes., Polymer 2004, 45, 5847.

Jones, D. J.; Roziere, J., Recent advances in the functionalism of polybenzimidazole and polyetherketone for fuel cell applications, J. Membr. Sci. 2001, 185, 41.

Ding, J.; Chuy, C.; Holdcroft, S., Enhanced Conductivity in Morphologically Controlled Proton Exchange Membranes: Synthesis of Macromonomers . . . , Macromolecules 2002, 35, 1348.

Cassidy, P. E.; Aminabhavi, T. M.; Farley, J. M., Polymers Derived from Hexafluoroacetone, J. Macrom. Sci., Rev. Macromol. Chem. and Phys., 1989, C29, 365.

Rao, V. L., Polyether Ketones, J. Macrom. Sci., Rev. Macromol. Chem. And Phys., 1995, C35, 661.

Genova-Dimitrova, P.; Baradie, B.; Foscallo, D.; Poinsignon, C.; Sanchez, J. Y., Ionomeric membranes for proton exchange membrane fuel cell . . . , J. Membr. Sci. 2001, 185, 59.

Al-Omran, A.; Rose, J. B., Synthesis and sulfonation of poly(phenylene ether ether sulfone)s containing methylated hydroquinone, Polymer 1996, 37, 1735.

Lafitte, B.; Karisson, L. E.; Jannasch, P., Sulfophenylation of Polysulfones for Proton-Conducting Fuel Cell Membranes, Macromol. Rapid Commun. 2002, 23, 896.

Kerres, J.; Cui, W.; Richie, S., New Sulfonated Engineering Polymers via the Metalation Route. I. Sulfonated . . . , J. Polym. Sci., Part A: Polym. Chem. 1996, 34, 2421.

Ueda, M.; Toyota, H.; Ochi, T.; Sugiyama, J.; Yonetake, K.; Masuko, T.; Teramoto, T., Synthesis and Charaterization of . . . , J. Polym. Sci., Polym. Chem. Ed. 1993, 31, 853.

Miyatake, K.; Hay, A. S., Sythesis and Properties of Poly(arylene ether)s Bearing Sulfonic Groups on Pendant Phenyl Rings, J. Polym. Sci., Part A: Polym. Chem. 2001, 39, 3211.

Lafitte, B.; Puchner, M.; Jannasch, P., Proton Conducting Polysulfone Ionomers Carrying Sulfoaryloxybenzoyl Side Chains, Macromol. Rapid Commun. 2005, 26, 1464.

Yin, Y.; Yamada, O.; Suto, Y.; Mishima, T.; Tanaka, K.; Kita, H.; Okamoto, K., Synthesis and Characterization of Proton . . . , J. Polym. Sci., Polym. Chem. 2005, 43, 1545.

Chen, S.; Yin, Y.; Tanaka, K.; Kita, H.; Okamoto, K., Synthesis and properties of novel side-chain-sulfonated polyimides from bis[4-(4-aminophenoxy) . . . , Polymer 2006, 47 2660.

Yasuda, T.; Li, Y.; Miyatake, K.; Hirai, M.; Nanasawa, M.; Watanabe, M., Synthesis and Properties of Polyimides Bearing . . . , J. Polym. Sci. Part A: Polym. Chem., 2006, 44, 3995.

Liu, B. J.; Hu, W.; Chen, C. H.; Jiang, Z. H.; Zhang, W. J.; Wu, Z. W.; Matsumoto, T., Soluble aromatic poly(ether ketone)s with a pendant . . . , Polymer 2004, 45, 3241.

Liu, B. J.; Wang, G. B.; Hu, W.; Jin, Y. H.; Chen, C. H.; Jiang, Z. H.; Zhang, W. J.; Wu, Z.W.; Wei, Y., J. Polym. Sci., Part A: Polym. Chem., 2002, 40, 3392.

Shibuya, N.; Porter, R. S., Kinetics of Peek Sulfonation in Concentrated Sulfuric Acid, Macromolecules, 1992, 25, 6495.

Bishop, M. T.; Karasz, F. E.; Russo, P. S.; Langley, K. H., Solubility and Properties of a Poly(aryl ether ketone) in Strong Acids, Macromolecules 1985, 18, 86.

Bailly, C.; Williams, D. J.; Karasz, F. E.; MacKnight, W. J., The sodium salts of sulphonated poly(aryl-ether-ketone) (Peek): Preparation and . . . , Polymer 1987, 28, 1009.

Fujimoto, C.; Hickemer, M.; Cornelius, C.; Loy, D., Ionomeric Poly(phenylene) Prepared by Diels-Alder Polymerization: Synthesis and Physical . . . Macromolecules 2005, 38, 5010.

Xing, P. X.; Robertson, G. P.; Guiver, M. D.; Mikhailenko, S.D.; Kaliaguine, S., Sulfonated Poly(aryl ether ketone)s Containing the . . . , Macromolecules, 2004, 37, 7960.

Pivovar, B. S.; Wang, Y. X.; Cussler, E. L., Pervaporation membranes in direct methanol fuel cells, J. Membr. Sci., 1999,154, 155.

Lui, B.; Robertson, G. P.; Kim, D.; Guiver, M.; Hu, W.; Jiang, Z., Aromatic Poly(ether ketone)s with Pendant Sulfonic Acid Phenyl Groups . . . , Macromolecules, 2007, 1934.

Risse, W.; Sogah, D.; Synthesis of Soluble High Molecular Weight Poly(aryl ether ketones) Containing Bulky Substituents, Macromolecules, 1990, 23, 18, 4029.

Extended European Search Report of Nov. 11, 2010 on corresponding European application 07763890.6.

Chen, S.; Yin, Y.; Tanaka, K.; Kita, H.; Okamoto, K., Synthesis and properties of novel side-chain-sulfonated polyimides from bis[4-(4-aminophenoxy) . . . , Polymer 2006, 47 2660.

Lee DH, et al. (2007) Materials Science Forum, vol. 544-545, pp. 1065-1068.

Liu B, et al. (2010) Polymer. vol. 51, pp. 403-413.

POLY(ARYL ETHER) WITH PENDENT SULFONIC ACID PHENYL GROUPS

CROSS-REFERENCE TO RELATED APPLICATIONS

This application is a national entry of International application PCT/CA2007/001229 filed on Jul. 13, 2007 and claims the benefit of United States Provisional Patent Application U.S. Ser. No. 60/832,130 filed on Jul. 21, 2006, the entire contents of which are hereby incorporated by reference.

FIELD OF THE INVENTION

The present invention is related to poly(aryl ether)s, for example polyetherketones, with pendent sulfonic acid phenyl groups, method of preparation thereof, and use thereof in proton exchange membranes.

BACKGROUND OF THE INVENTION

Fuel cells, devices transforming chemical energy directly into electricity, have been regarded as one of the promising clean future power sources. Proton exchange membrane fuel cell (PEMFC) and direct methanol fuel cell (DMFC) using polymeric proton conductive membranes as one of key components are drawing more and more attention for their utility in automotive and portable electronic applications.[1,2] A continuous effort is being made to develop new high-performance proton conductive membranes as an alternative to Nafion®, which is the principal material used as the polymeric electrolyte in PEMFC systems because of its excellent chemical and mechanical stabilities, and high proton conductivity. However, high cost, low operation temperature (<80° C.), high methanol crossover, and environmental recycling uncertainties of Nafion and other similar perfluorinated membranes are limiting their widespread commercial application in PEMFC and DMFC.[3-6]

Aromatic polymers with sulfonic acid groups may be promising materials for PEMs because of their outstanding thermal and chemical stability. Sulfonated derivatives of polyethersulfone (SPES),[7-9] polyimide (SPI),[10-12] polyimidazole,[13] polyarylether,[14,15] polyphenylene[16,17] and poly(phenylquinoxaline)[18] are among those being investigated as potential PEMs. However, to further simplify the preparation process and enhance performance of these materials, there are still some challenges, such as stereo-controllable chemical structures including easily-controllable degree of sulfonation (DS) and sulfonation sites, and well refined microstructure by grafting, alternating and blocking polymerization.[19]

Aromatic polyetherketones (aromatic PEKS) are well known as high performance thermoplastics for their overall combination of chemical, physical and mechanical properties.[20,21] As a class of promising PEM materials, several series of PEKs have been prepared so far. Most of the sulfonated PEK membranes were developed based on post-sulfonated commercial polymers or on copolymers produced from sulfonated monomers. Two general synthetic approaches have been used to realize the introduction of sulfonic acid groups into this family of polymers.[3] One approach is post-sulfonation of existing polymers, and the other is direct copolymerization of sulfonated monomers. In the case of the post-sulfonation approach, this method is attractive because of the available resource of commercial polymers, such as Victrex® poly(ether ether ketone) (PEEK), as well as simple reaction procedures, enabling the process to be readily scaled up. Meanwhile, difficulties may occasionally be encountered in the precise control of the sulfonation sites and the degree of sulfonation (DS), resulting in a random and less defined distribution of sulfonic acid groups along the polymer chain. In addition, rigorous reaction conditions, such as high temperature and strongly acidic sulfonating agent, are usually used to prepare sulfonation polymers, which in some cases may lead to the occurrence of side reactions and degradation of the polymer backbone.[3,19-25] In the case of the sulfonated monomer approach, despite the limited number of available sulfonated monomers and the preparation difficulties of the some sulfonated monomers, the direct copolymerization of sulfonated monomer with other nonsulfonated monomers has the potential for synthesizing random copolymers with a better control of sulfonation content (SC) and more defined chain structures in comparison with the copolymers by post-sulfonation method.[26-28] Therefore, it is of interest to prepare sulfonated polymers via a post-sulfonation method that provides for controllable sulfonation sites and DS in a similar way to polymers prepared by the direct copolymerization methods.

Recently, there have been several stereo-controlled sulfonated polymers reported by Miyatake and Hay et al., and they also suggested that the polymers with the sulfonated groups attached to pendent side groups are very stable under heat, hydrolysis and oxidation.[29,30] Jannasch et al. reported several side-chain-acid poly(ether sulfone)s with some attractive properties based on lithiation reaction.[24,31] Meanwhile, polyimides with side-chain-acid substituents were also developed by Okamoto et al and Watanabe et al.[32-34]

There remains a need for effective materials for proton conducting membranes and for controllable methods of preparing such materials.

SUMMARY OF THE INVENTION

According to one aspect of the invention, there is provided a sulfonated poly(aryl ether) (SPAE) comprising a poly(aryl ether) (PAE) main chain and a sulfonated phenyl group pendent from the main chain. Preferably, the sulfonated phenyl group comprises a sulfonic acid group or salt thereof, for example an alkali metal sulfonate (e.g. sodium sulfonate). Preferably, the sulfonic acid group or salt thereof is in a para-position on the phenyl group with respect to the main chain. The sulfonated phenyl group may be substituted by one or more (preferably 1 or 2) other substituents, preferably organic moieties. Where a substituent is present on the sulfonated phenyl group, the substituent is preferably in an ortho-position with respect to the sulfonic acid group or salt thereof. The sulfonated poly(aryl ether) is preferably a sulfonated polyetherketone.

Also provided is a sulfonated poly(aryl ether) of formula (I) or a salt thereof:

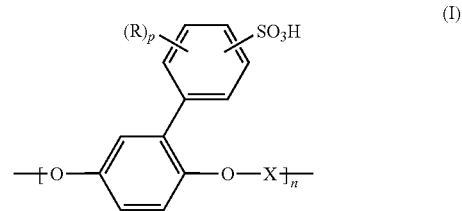

wherein X is

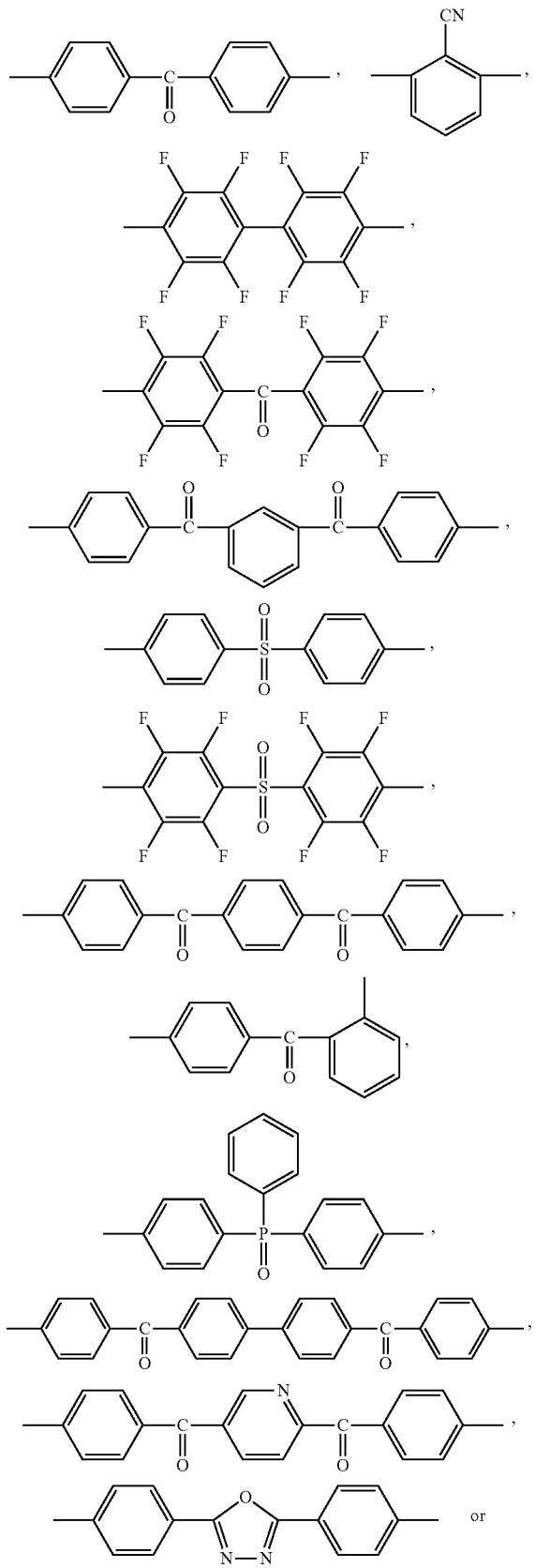

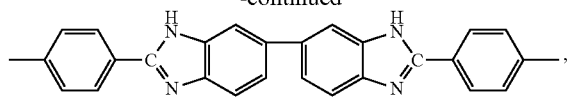

n is a non-zero integer from 0 to 10,000, p is 1 or 2, and R is hydrogen or an organic moiety.

There is also provided a sulfonated poly(aryl ether) of formula (II) or a salt thereof:

(II)

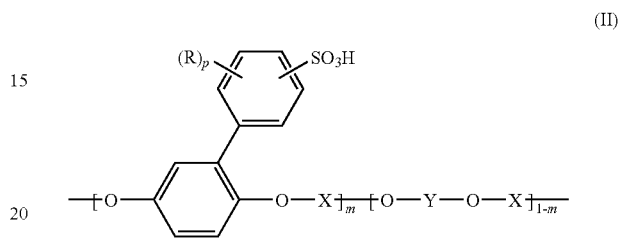

wherein m is a non-zero number from 0 to 1, X is as defined above, Y is

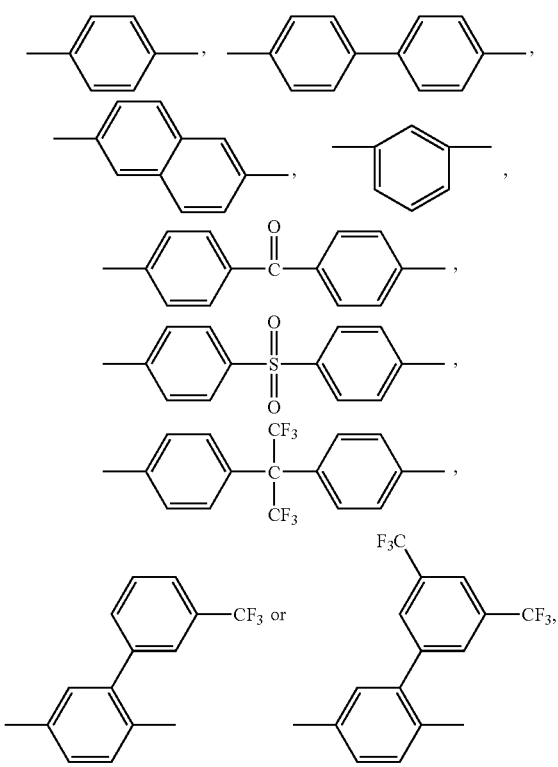

and p and R are as defined above.

The organic moiety may be the same or different and is preferably a substituted or unsubstituted $C_1$-$C_8$ alkyl, $C_6$-$C_{18}$ aryl, $C_7$-$C_{26}$ aralkyl, $C_7$-$C_{26}$ alkaryl, $C_1$-$C_8$ alkoxy, $C_6$-$C_{18}$ aryloxy group. The organic moiety may be substituted by one or more substituents, for example, halogens (e.g. F, Cl, Br, I), amines, amides, hydroxyl. The organic moiety may be, for example, methyl, ethyl, n-propyl, i-propyl, n-butyl, s-butyl, t-butyl, trifluoromethyl, phenyl, methoxy, phenoxy.

Preferably, R is hydrogen or a ring-activating organic moiety. Ring-activating organic moieties include, for example, unsubstituted alkyl, aryl, aralkyl, alkaryl, alkoxy and aryloxy groups. Preferably, the ring-activating organic moiety is an unsubstituted $C_1$-$C_8$ alkyl (e.g. methyl, ethyl, n-propyl, i-propyl, n-butyl, s-butyl, t-butyl), aryloxy (e.g. phenoxy) or aryl (e.g. phenyl) group.

Sulfonated poly(aryl ether)s of the present invention are preferably homopolymers or copolymers. Preferably, the sulfonated poly(aryl ether) has a number average molecular weight ($M_n$) in a range of from about 1,000 to about 1,000,000, more preferably from about 5,000 to about 500,000. They may be prepared by post-sulfonation of a poly(aryl ether) (PAE), or by pre-sulfonation of one or more monomers followed by polymerization of the monomers. Polymerization processes to produce poly(aryl ether) (PAE) homo- and co-polymers are well known in the art. Phenyl-containing PAEs may be readily prepared by one-step polymerization from commercially available monomers.

Sulfonated monomers and growing sulfonated polymer chains sometimes have problems with limited solubility. However, high molecular weight polymers may be produced by polymerizing non-sulfonated monomers. It is an advantage of the present invention that sulfonation may be effected after polymerization, therefore, high molecular weight sulfonated polymers may be readily produced. For example, for non-sulfonated Ph-PEEKK there is no insolubility problem, so high molecular weight polymers can be produced easily, and the polymer can then be sulfonated easily and site-specifically by post-sulfonation. In general, high MW polymers give better properties for PEMFC and DMFC.

Sulfonation may be accomplished by any suitable means. For poly(aryl ether)s (or monomers thereof) that are difficult to sulfonate, rigorous reaction conditions may be required (e.g. strong sulfonation reagent (fuming sulfuric acid, sulfur trioxide or chlorosulfonic acid), high temperature, long reaction time etc.).

However, it is an advantage of the present invention that the pendent phenyl group provides an opportunity to produce sulfonated poly(aryl ether)s under mild sulfonation conditions. Where the pendent phenyl group is unsubstituted or substituted by a ring-activating moiety, the phenyl ring is sufficiently activated that mild sulfonation conditions selectively sulfonate the pendent phenyl ring with one sulfonic acid (sulfonate) group. This provides the ability to more precisely control the sulfonation content (SC) of the sulfonated poly(aryl ether), thereby tuning the properties of PEMs that comprise the sulfonated poly(aryl ether). Mild sulfonation conditions include, for example, the use of concentrated sulphuric acid (e.g. 95-98%) at room temperature (e.g. 20-30° C.) for several hours.

The facile reaction (e.g. room temperature stirring with concentrated sulfuric acid), high degree of substitution, and controllable sulfonation sites (one site on the pendent phenyl ring) provides at least two methods of precisely controlling the sulfonation content (SC). A first method is based on production of homopolymers followed by sulfonation in which SC may be adjusted by selecting a second unsulfonable monomer. Homopolymers with well refined molecular structure may be produced. A second method is based on post-sulfonation of copolymers having controlled ratios of sulfonable/unsulfonable segments. In both methods, precisely controlling the sulfonation content of may be accomplished by changing the length of unsulfonable segments.

Thus, in one embodiment there is also provided a process for preparing a sulfonated poly(aryl ether) having a sulfonated pendent phenyl group, the process comprising: reacting a poly(aryl ether) having a pendent phenyl group with sulphuric acid having a concentration of from 95% to 98%.

The poly(aryl ether) having a pendent phenyl group may a compound of formula (III) or (IV):

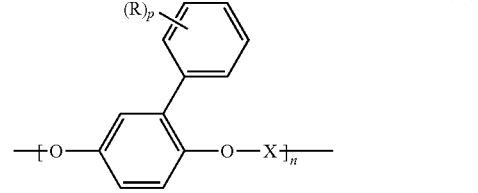

(III)

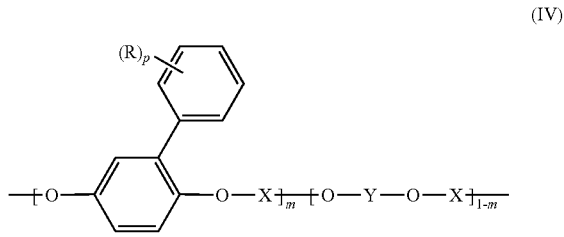

(IV)

wherein n, m, p, X, Y and R are as defined previously.

Polymers of the present invention are useful in proton exchange membranes (PEMs). PEMs cast from these polymers may have one or more of the following attractive properties: high proton transport to enable the passage of high currents with low resistance; high thermal, dimensional and chemical stability; mechanical strength and film integrity for thin films in both dry and hydrated states; operational temperatures up to 140° C.; low gas and fuel crossover properties; low-cost materials and environmental compatibility; and, easy preparation and suitable for scale-up. Proton exchange membranes comprising polymers of the present invention are useful in fuel cells, water electrolyzers, ion exchange membranes, components of bipolar membranes, etc., particularly in fuel cells.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Chemicals and Materials

Figure 1:
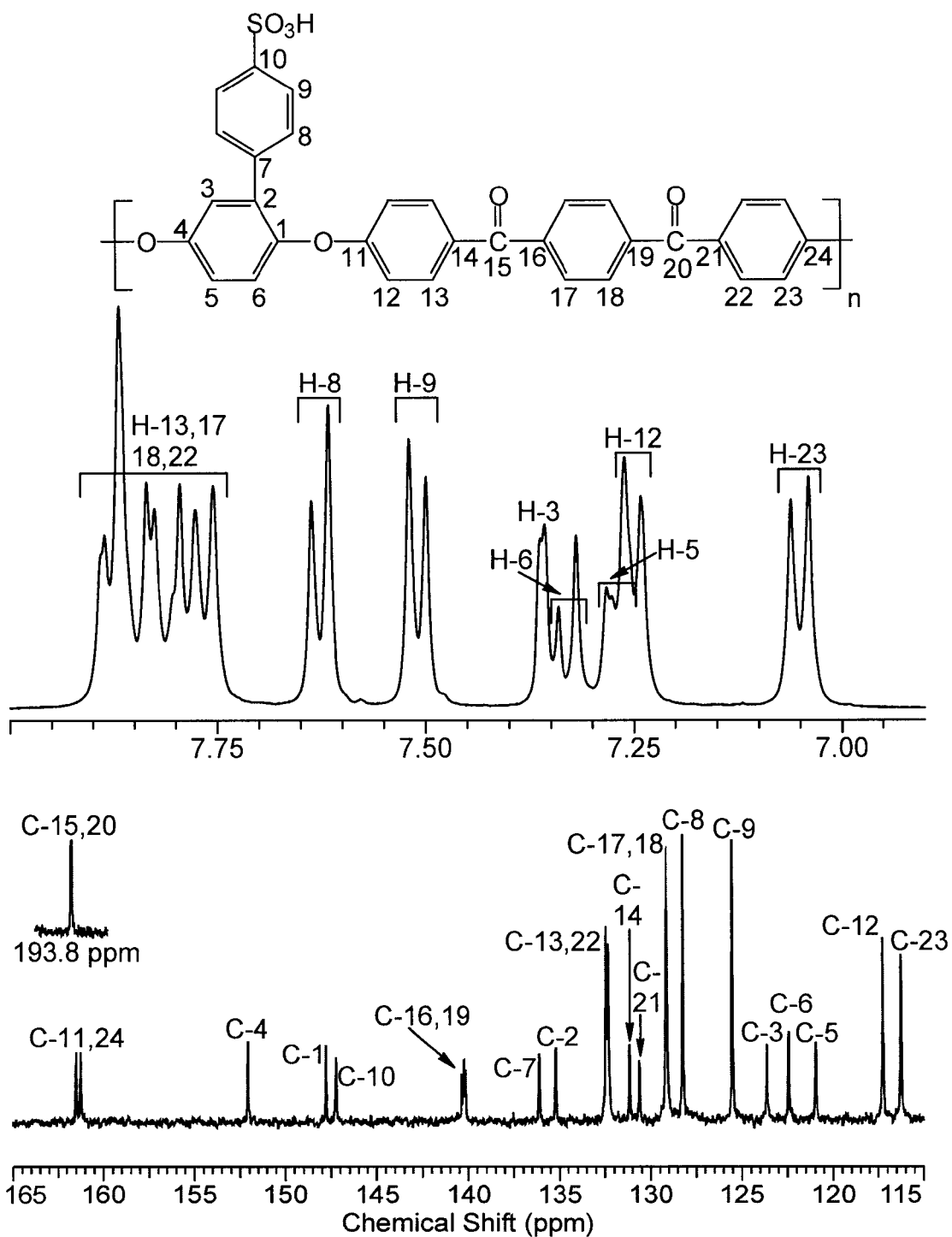
FIG. 1 depicts $^1$H NMR and $^{13}$C spectra for Ph-SPEEKK.

Bisphenol monomers, (3-methyl)phenylhydroquinone, (3-trifluoromethyl)phenylhydroquinone, (3,5-dimethyl)phenylhydroquinone, (3,5-ditrifluoromethyl)phenylhydroquinone, and (4-phenoxyl)phenylhydroquinone, were synthesized according to a reported procedure.[35,36] Difluorinated monomers, 1,4-bis(4-fluorobenzoyl)benzene, and 4,4'-bis(4-fluorobenzoyl)biphenyl, were obtained from Jilin University, and recrystallized from ethanol or chlorobenzene before use. Phenylhydroquinone and (4,4'-hexafluoroisopropylidene) diphenol were obtained from Sigma-Aldrich Ltd., and recrystallized from toluene before use. All other chemicals were obtained from commercial sources, and used without further purification.

Synthesis of Starting Materials:

Synthesis of the following statistical copolymers was accomplished by nucleophilic aromatic substitution polycondensation.[35-37] As an example, Me-PEEK was prepared as follows: To a 100 mL three-necked flask equipped with a magnetic stirrer, a nitrogen inlet, and a Dean-Stark trap with a condenser, were added (3-methyl)hydroquinone (2.002 g, 0.01 mol), 4,4'-difluorobenzophenone (2.180 g, 0.01 mol), anhydrous K$_2$CO$_3$ (1.794 g, 0.013 mol), DMAc (18 mL) and toluene (15 mL). The system was allowed to reflux for 3 h, and then the toluene was removed. The reaction mixture was heated to 180° C. After 10 h, another 10 mL of DMAc was added into the viscous reaction mixture. The polymerization was complete after another 2 h. The viscous solution was then poured into 150 mL of ethanol. The polymer was refluxed in deionized water and ethanol several times to remove the salts and solvents, and dried at 120° C. for 24 h. All the other starting polymers were prepared using the same synthesis and purification routine. Their T$_g$s and molecular weights are listed in Tables 1 and 2.

In Table 2, number-average molecular weight (M$_n$) and weight-average molecular weight (M$_w$) were estimated by GPC using tetrahydrofuran and poly(styrene) as an eluent and standard. Glass transition temperature (T$_g$) was obtained from the second heating trace of DSC measurements conducted at a heating rate of 10° C. per minute. Onset temperature of decomposition (DT) was measured by TGA at a heating rate of 10° C. per minute under nitrogen gas. Temperature at 5% weight loss (T$_{5\%}$) was measured by TGA at a heating rate of 10° C. per minute under nitrogen gas.

TABLE 1

Viscosity, IEC and thermal properties of the polymers.

| polymer | η (dL/g) unS | η (dL/g) S | T$_g$ (° C.) unS | T$_g$ (° C.) S | TD (° C.) unS | TD (° C.) S | T$_{5\%}$ (° C.) unS | T$_{5\%}$ (° C.) S | IEC (meq/g) Calc. | IEC (meq/g) Exp. | EW (g/mol SO$_3$) Calc. |
|---|---|---|---|---|---|---|---|---|---|---|---|
| Me-SPEEK | 0.96 | 2.16 | 147 | 190 | 453 | 207 | 465 | 239 | 2.18 | 2.19 | 459 |
| Me-SPEEKK | — | 3.42 | 159 | 167 | 462 | 206 | 478 | 240 | 1.78 | 1.80 | 562 |
| Me-SPEEKDK | — | 1.20 | 170 | 182 | 454 | 214 | 472 | 276 | 1.57 | 1.61 | 637 |
| Ph-SPEEK | 0.62 | 1.50 | 158 | 185 | 512 | 210 | 524 | 241 | 2.25 | 2.23 | 444 |
| Ph-SPEEKK | — | 3.10 | 166 | 174 | 496 | 204 | 506 | 251 | 1.82 | 1.76 | 549 |
| Ph-SPEEKDK | — | 3.35 | 186 | — | 502 | 212 | 522 | 262 | 1.60 | 1.60 | 625 |
| Me-6F-SPEEK-40 | 0.70 | 1.46 | 146 | 157 | 451 | 202 | 477 | 278 | 0.83 | 0.84 | 1205 |
| Me-6F-SPEEK-60 | 0.62 | 4.85 | 145 | 185 | 448 | 205 | 473 | 254 | 1.26 | 1.28 | 794 |
| Me-6F-SPEEK-80 | 0.96 | 2.90 | 146 | 185 | 435 | 202 | 455 | 256 | 1.71 | 1.80 | 585 |
| Ph-6FA-SPEEK-40 | 0.98 | 2.98 | 164 | 163 | 510 | 202 | 531 | 253 | 0.82 | 0.85 | 1220 |
| Ph-6FA-SPEEK-60 | 1.08 | 3.43 | 164 | 167 | 513 | 202 | 536 | 256 | 1.27 | 1.37 | 787 |
| Ph-6FA-SPEEK-80 | 1.30 | 3.19 | 163 | 168 | 518 | 213 | 522 | 264 | 1.75 | 1.82 | 571 |

TABLE 2

Investigation of the selectivity of stereo-controlled sulfonation reaction.

| starting PEEKs with the following side group | $M_n/M_w$ | Tg (° C.) | DT (° C.) | $T_{5\%}$ (° C.) | PEEKs after sulfonation |
|---|---|---|---|---|---|
| 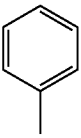<br>phenyl | 40000/<br>76000 | 158 | 512 | 524 | 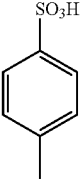<br>Ph-SPEEK |
| 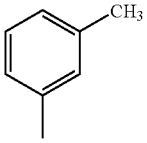<br>3-methylphenyl | 60000/<br>170000 | 147 | 453 | 465 | 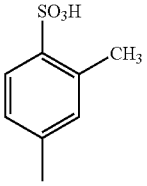<br>Me-SPEEK |
| 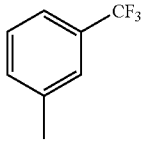<br>3-trifluoromethyphenyl | 44000/<br>88000 | 134 | 525 | 533 | No obvious reaction |
| 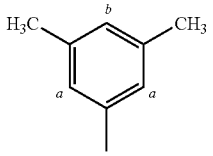<br>3,5-dimethyphenyl | 56000/<br>170000 | 162 | 438 | 444 | 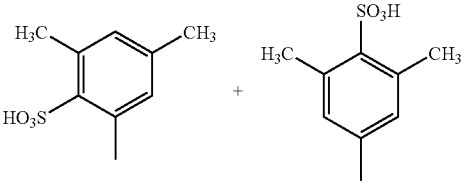<br>DiMe-SPEEK |
| 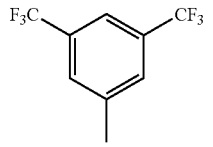<br>3,5-ditrifluoromethyphenyl | 33000/<br>62000 | 146 | 520 | 527 | No obvious reaction |
| 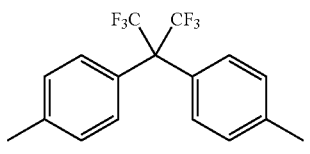<br>hexafluoroisopropyldiphenyl | 68000/<br>140000 | 166 | 505 | 521 | No obvious reaction |

TABLE 2-continued

Investigation of the selectivity of stereo-controlled sulfonation reaction.

| starting PEEKs with the following side group | $M_n/M_w$ | Tg (° C.) | DT (° C.) | $T_{5\%}$ (° C.) | PEEKs after sulfonation |
|---|---|---|---|---|---|
| 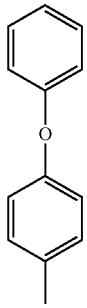<br>4-phenoxylphenyl | 35000/ 67000 | 146 | 516 | 523 | 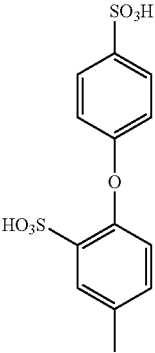<br>DiPh-SPEEK |

Preparation of Sulfonated Polymers and their Membranes:

In view of high substitution reactivity of the pendent phenyl groups on the copolymers, a relatively mild sulfonating reagent and ambient temperature were adopted. A typical reaction was shown as follows:

To a 100 ml of flask, 5 g of Me-PEEK and 100 ml of concentrated sulfuric acid were added. After stirring at room temperature for 3 h, the homogeneous vicious solution was poured into a mixture of water and ice to get a silk-like solid. The solid was washed with water until the water reached neutral. The sulfonated Me-PEEK was dried in a vacuum oven at 100° C. for 24 h.

An amount of 1.0 g polymer was dissolved in 20 mL of DMAc and filtered. The filtered solution was poured onto a glass plate and dried at 50° C. under a constant purge of $N_2$ for 4 to 5 days. The resulting flexible membrane was dried in a vacuum oven at 120° C. for 24 h. The thickness of all membrane films was in the range of 100 to 150 μm.

All the other sulfonated polymers were prepared using the same procedure, and $^1$H NMR spectroscopy was used to monitor the degree of substitution.

Me-SPEEK: $^1$H NMR (DMSO-$d_6$): 7.85-7.65 ppm, m, 5H, 7.38-7.16 ppm, m, 7H, 7.10-6.99 ppm, m 2H, 2.49 ppm, m (overlapped by DMSO signal).

Ph-SPEEK: $^1$H NMR (DMSO-$d_6$): 7.86-7.65 ppm, m, 4H, 7.58 ppm, d (8 Hz), 2H, 7.49 ppm, d (8 Hz), 2H, 7.37-7.33 ppm, d (2 Hz), 1H, 7.34-7.17 ppm, m, 4H, 7.07-7.00 ppm, m, 2H.

DiMe-SPEEK: $^1$H NMR (DMSO-$d_6$): 7.87-7.59 ppm, m, 4H, 7.38-7.15 ppm, m, 4.5H, 7.13 ppm, 1.7H, 7.09-6.96 ppm, m, 2.3H, 6.93 ppm, s, 0.3H, 6.77 ppm, s, 0.3H, 2.56-2.47 ppm, m (overlapped by DMSO signal).

DiPh-SPEEK: $^1$H NMR (DMSO-$d_6$): 8.00 ppm, s, 1H, 7.87-7.64 ppm, m, 4H, 7.54 ppm, d (8 Hz), 2H, 7.50 ppm, d (8 Hz), 1H, 7.35-7.15 ppm, m, 4.5H, 7.12-6.96 ppm, m, 2.5H, 6.87-6.74 ppm, m, 3H.

Me-SPEEKK: $^1$H NMR (DMSO-$d_6$): 7.95-7.64 ppm, m, 9H, 7.40-7.20 ppm, m, 6.70H, 7.10-7.00 ppm, m, 2.3H, 2.49 ppm, m (overlapped by DMSO signal).

Me-SPEEKDK: $^1$H NMR (DMSO-$d_6$): 8.02-7.66 ppm, m, 13H, 7.39 ppm, d, 2 Hz), 1H, 7.37-7.21 ppm, m, 5.75H, 7.06 ppm, d, 2.5H).

Ph-SPEEKK: $^1$H NMR (DMSO-$d_6$): 7.93-7.72 ppm, m, 8H, 7.58 d (8 Hz), 2H, 7.50 ppm, d (8 Hz), 2H, 7.40-7.21 ppm, m, 5H, 7.06 ppm, d (8 Hz), 2H.

Ph-SPEEKDK: $^1$H NMR (DMSO-$d_6$): 8.02-7.73 ppm, m, 12H, 7.60 ppm, d (8 Hz), 2H, 7.51 ppm, d (8 Hz), 2H, 7.39 ppm, d (2 Hz), 1H, 7.35 ppm, 2 (8 Hz), 1H, 7.31-7.22 ppm, m, 3H, 7.07 ppm, d (8 Hz), 2H.

Characterization and Measurements:

FTIR spectra of the samples were measured on a Nicolet 520 Fourier transform spectrometer, and a diamond cell was used as a holder for the thin films of the polymers. The thin films for the FTIR measurements were cast from DMAc polymer solution. $^1$H and $^{13}$C NMR spectra of the sulfonated polymers were obtained on a Varian Unity Inova NMR spectrometer operating at frequencies of 399.95 MHz for $^1$H and 100.575 MHz for $^{13}$C. An indirect detection probe was used for the acquisition of 1D and 2D spectra. Deuterated dimethylsulfoxide (DMSO-$d_6$) was selected as the solvent and the DMSO signals at 2.50 ppm ($^1$H NMR) and 39.51 ppm ($^{13}$C NMR) were used as the chemical shift references.

Inherent viscosities ($\eta_{inh}$) were measured using an Ubbelohde viscometer at a polymer concentration of 0.5 g/dL in DMAc solutions at 30° C.

A TA Instruments thermogravimetric analyzer (TGA) instrument model 2950 was used for evaluating thermal stability of the polymers. Polymer samples for TGA analysis were preheated at 150° C. for 40 min under nitrogen atmosphere to remove moisture. Samples were then heated at 10° C./min from 50° C. to 800° C. under nitrogen atmosphere. A TA Instruments differential scanning calorimeter (DSC) model 2920 was used for measuring $T_g$. Samples for DSC analysis were initially heated at a rate of 10° C./min under nitrogen atmosphere to the temperature below their decomposition temperature, followed by quenching them to room temperature. Following this, the samples were heated at a rate of 10° C./min under nitrogen atmosphere to evaluate $T_g$.

The proton conductivities of the membranes were estimated from AC impedance spectroscopy data, obtained over a frequency range of 1 to $10^7$ Hz with oscillating voltage of 100 mV, using a Solartron 1260 gain phase analyzer. Specimens in the form of 20×7 mm strips were soaked in deionized water for at least 24 h prior to the test. Each specimen was placed in a temperature controlled cell open to the air by a pinhole, where it was equilibrated at 100% RH at ambient pressure. Each end of the membrane strip was clamped in a frame between two stainless steel electrodes. Measurements, in four-point mode, were carried out after sample conditioning in the closed cell overnight or longer. The conductivity (σ) of the samples in the longitudinal direction was calculated, using the relationship σ=L/(R×d×W) where L is the distance between the electrodes, d and W are the thickness and width of the sample stripe respectively. R was derived from the low intersect of the high frequency semi-circle on a complex impedance plane with the Re (Z) axis.

Mechanical properties of the thin dry and wet films were evaluated at room temperature on an Instron 5565 instrument at a strain rate of 10 mm/min, and a 500 N load cell was used. The samples were prepared by cut into a dumbbell shape (DIN-53504-S3A). The samples in wet state were obtained by immersing the samples in water for 48 h, and the samples in dry state were obtained by putting samples in vacuum oven at 100° C. for 24 h.

TEM samples were stained by immersing films in lead acetate aqueous solution for 24 h, thoroughly washed with water, and dried at room temperature. Polymer samples were embedded in polystyrene. Specimen microtomy was performed using Reichert-Jung UltraCut E. A sample slice was placed onto a 300 mesh carbon-coated holey TEM copper grid and was dried in vacuum. The dried grid was then loaded into a double tilt sample holder. The sample was thus examined with a Philips CM20 STEM equipped with a Gatan UltraScan 1000 CCD camera combined with a Digital Micrograph Software (dm3.4) and an energy dispersive x-ray spectrometer: INCA Energy TEM 200. TEM images were taken at 120 kV.

Water Uptake and Swelling Ratio Measurements:

The membranes were dried at 100° C. overnight prior to the measurements. After measuring the lengths and weights of dry membranes, the sample films were soaked in deionized water for 24 h at predetermined temperatures. Before measuring the lengths and weights of hydrated membranes, the water was removed from the membrane surface by blotting with a paper towel.

The water uptake content was calculated by:

$$\text{Water uptake (\%)} = \frac{\omega_{wet} - \omega_{dry}}{\omega_{dry}} \times 100\%$$

where $\omega_{dry}$ and $\omega_{wet}$ are the weights of dried and wet samples respectively.

The swelling ratio was calculated by:

$$\text{Swelling ratio (\%)} = \frac{l_{wet} - l_{dry}}{l_{dry}} \times 100\%$$

where $l_{dry}$ and $l_{wet}$ are the lengths of dry and wet samples respectively.

Oxidative Stability, Ion Exchange Capacity (IEC), and Methanol Permeability:

Oxidative stability of the membranes was tested by immersing the films into Fenton's reagent (3% $H_2O_2$ containing 2 ppm $FeSO_4$) at 80° C. Their retained weights (RW) of membranes after treating in Fenton's reagent for 1 h and the dissolved time (t) of polymer membranes into the reagent were used to evaluate oxidative resistance.

IEC of the sulfonated polymers was measured using a typical titration method. The films in acid form were equilibrated with 100 mL of 1 M NaCl for 24 h. The amount of the $H^+$ released from the membranes was determined by titration of 0.1 M NaOH aqueous solution and phenolphthalein as an indicator.

Methanol permeability was measured using a simple two compartment glass diffusion cell. A membrane (2 cm×2 cm) was placed between two silicone rubber gaskets and with the two compartments clamped together around the gaskets. The active area of the membrane was 1.757 cm². Compartment A was filled with 100 mL of 10% v/v (2.47 M) methanol with an internal standard of 0.2% v/v (0.022 M) 1-butanol in aqueous solution. Compartment B was filled with 100 mL of 0.2% v/v 1-butanol solution.

The diffusion cell was placed in a water bath held at 30° C. and each compartment was stirred by a separate stir plate to ensure uniform stirring. Samples (4 μL each) were removed from compartment B at intervals of approximately 15 minute each. Methanol concentrations were determined by $^1H$ NMR spectroscopy.

Selectivity of Stereo-Controlled Sulfonation Reaction:

Sulfonation is an electrophilic reaction, and the rate and position of substitution of sulfonic acid is determined by the substituents of benzene rings. In order to find PEEKs that could be easily sulfonated via a post-sulfonation method, aromatic PEEKs with phenyl, methyl, trifluoromethyl, dimethyl, ditrifluoromethyl, and phenoxylphenyl pendent groups were evaluated for selectivity for sulfonation substitution, as shown in Scheme 1. Basic properties are listed in Table 2.

Scheme 1
Polymers for the selectivity of stereo-controlled sulfonation reaction

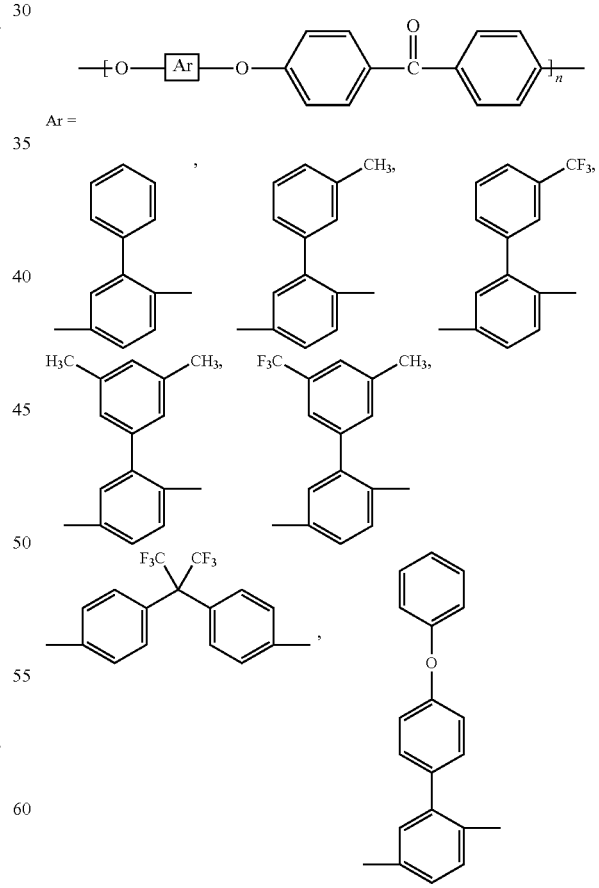

It is well known that the two benzene rings connected with strong electron-withdrawing carbonyl group are deactivated and no electrophilic sulfonation substitution reaction occurs.

It is interesting to note that the benzene ring activated by two phenoxy groups on the backbone and bearing a pendent phenyl ring was not substituted by sulfonated groups under the given conditions from the $^1$H NMR results. This phenomenon could be explained by the effect of steric hindrance and complex interaction of substituents. Because of the good solubility in DMSO, the sulfonation reaction could be readily monitored by NMR spectroscopy. Rigorous sulfonation conditions, such as high reaction temperatures, long reaction periods, and strong sulfonation reagents, may lead to destruction of the polymer chain and the resulting loss of mechanical strength. In the present study, a simple and mild sulfonation reaction condition of room temperature sulfuric acid was applied to effect the sulfonation of the evaluated polymers. The results showed that all of monomethylated, phenylated and phenoxylphenylated PEEKs had outstanding selectivity of sulfonation reaction by sulfuric acid took place, which was achieved within a short reaction period. Due to the existence of the deactivated trifluoromethyl, no substitution reaction was observed for trifluoromethylated and ditrifluoromethylated PEEKs. For dimethylated PEEK (DiMe-SPEEK), it did not have good substitution selectivity. Positions a and b could be substituted and substitution ratios were around 30% and 70%, respectively. Single-acid substitution on the side group every repeat unit for Me-PEEK and Ph-PEEK and double-acid substitution for Ph-O-Ph-PEEK (DiPh-SPEEK) could be achieved under these convenient reaction conditions.

Sulfonation Reactivity Comparison of Peek, Phenylated and 4-Methylphenylated PEEKs:

To access low-cost PEM membranes, a straightforward method is to introduce sulfonic acid groups into commercial polymers. Sulfonated PEEK (Victrex) has been widely studied based on its high performance. Bishop et al.[38-40] reported that it took up to 33 days in 97.4% sulfuric acid at room temperature to obtain the fully sulfonated PEEK, as shown in Scheme 2.

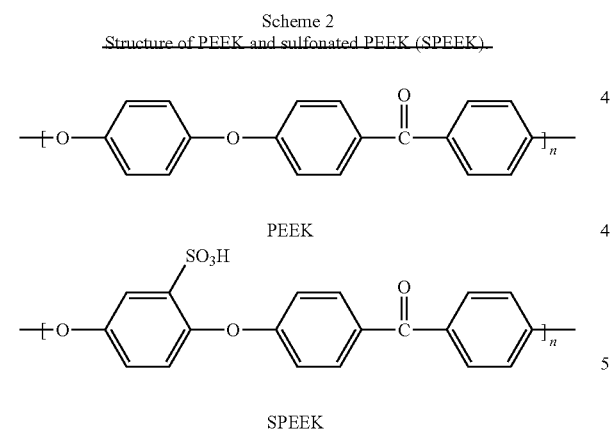

Scheme 2
Structure of PEEK and sulfonated PEEK (SPEEK).

PEEK

SPEEK

To enhance the rate of sulfonation reaction of PEEK, high reaction temperature and strong sulfonation reagent (e.g. fuming sulfuric acid) must be used. That could lead to the decomposition of polymer and the occurrence of side reaction. It is difficult to concisely control the DS, which is an important parameter for proton conductivity and dimensional stability of membranes.

In comparison to the sulfonation of PEEK, reaction rates for phenylated and 4-methyphenylated PEEKs are considerably more advantageous. For both of them, the sulfonation reaction proceeded rapidly in 96-98% sulfuric acid at room temperature, the highly sulfonated polymers being obtained within 3 h. Scheme 3 provides a representation comparing post-sulfonation of main-chain-acid PEKs with post-sulfonation of side-chain-acid PEKs. It was also interesting to note that sulfonation was site-specific. Only one substitution site on the pendent benzene ring per repeat unit of Me-SPEEK (DS≧90%) and Ph-SPEEK (DS~100%) was found by $^1$H NMR technology.

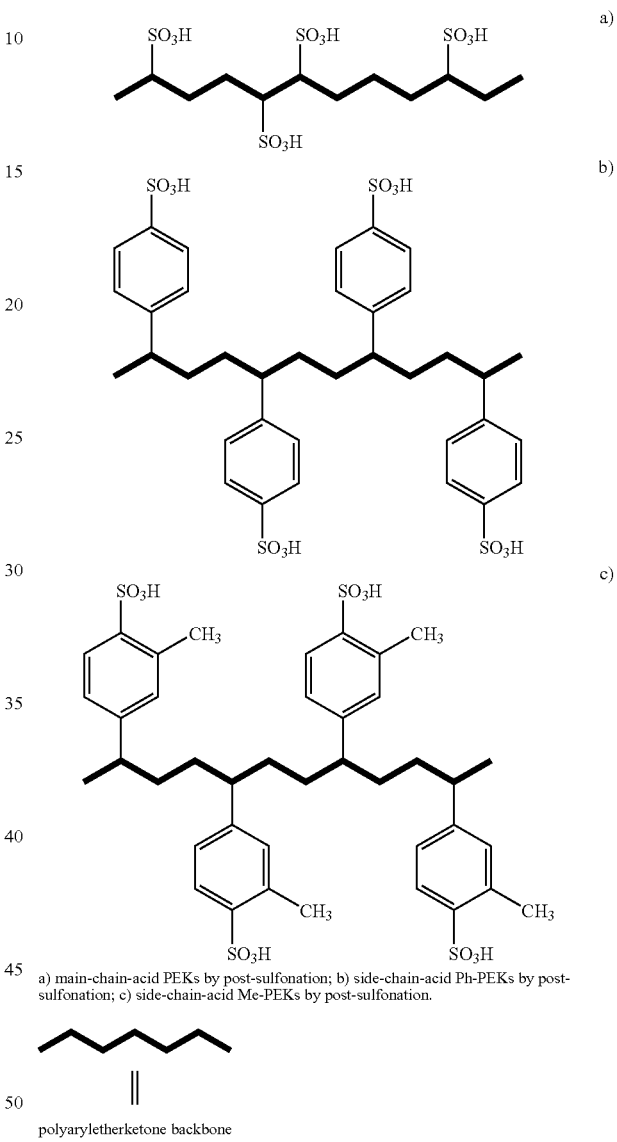

a) main-chain-acid PEKs by post-sulfonation; b) side-chain-acid Ph-PEKs by post-sulfonation; c) side-chain-acid Me-PEKs by post-sulfonation.

polyaryletherketone backbone

Sulfonation Content Adjustment:

The sulfonic acid content of PEM materials is an important factor because it is strongly related to proton conductivity, water uptake and dimensional stability of membranes. According to the reported literature, reaction conditions, such as reaction time and temperature, have often been used to control the DS. It is evident that precise control DS via this method is difficult. It has also been shown that the sulfonation of PEEK in sulfuric acid cannot be used to produce truly random copolymers at sulfonation levels less than 30% because dissolution and sulfonation occur in a heterogeneous environment. A facile and efficient reaction combined with controllable sulfonation sites makes it possible to control DS by length adjustment of copolymer segments that cannot be sulfonated.

A first method used for controlling the sulfonic acid content was the polymerization of bisphenol monomer containing pendent group with various difluorodiphenylketone monomers of different length to give homopolymers with well defined molecular structure. The bisphenol segment is readily sulfonated while the phenylketone segment is not.

A second method to control sulfonic acid content is based on copolymerization, which is often applied to prepare PEM materials from sulfonated monomers to control sulfonic acid content. Copolymers were prepared with certain ratios of sulfonable/unsulfonable segments via a copolymerization method, and then post-sulfonation was conducted. A copolymer containing easily sulfonable Me-PEEK segments and unsulfonable 6F-PEEK segments were evaluated. Partially fluorinated polymers are regarded as promising candidates as PEM materials for fuel cells because of their relatively low water swelling and enhanced compatibility with the electrode layer.

Schemes 4, 5 and 6 show the sulfonation of methylphenylated and phenylated PEKs under mild reaction conditions to control sulfonic acid content.

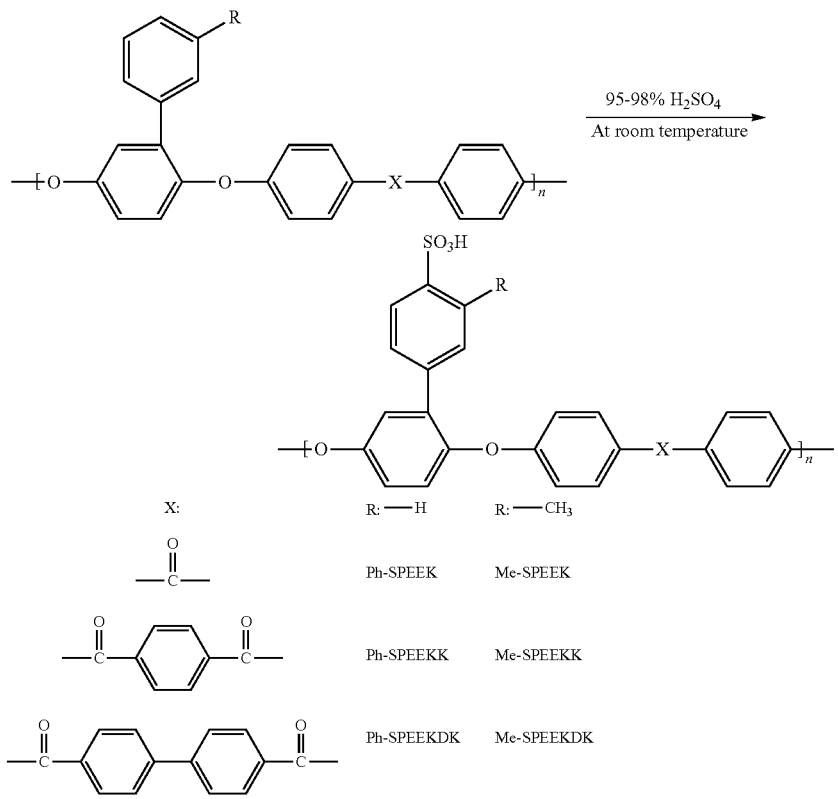

Scheme 4
Preparation of homopolymers with (4-sulfonic acid)phenyl and (4-sulfonic acid-3-methyl) phenyl side groups.

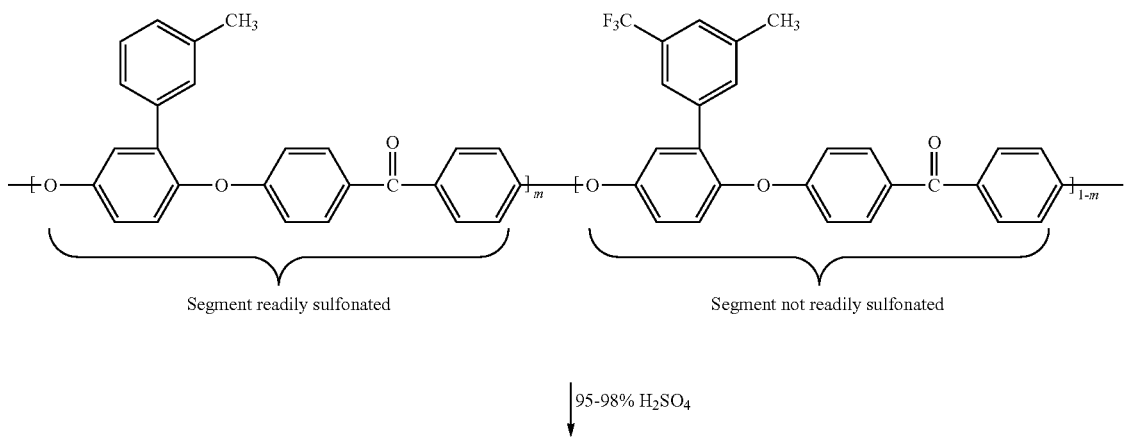

Scheme 5 Preparation of copolymers with (4-sulfonic acid-3-methyl) phenyl side group.

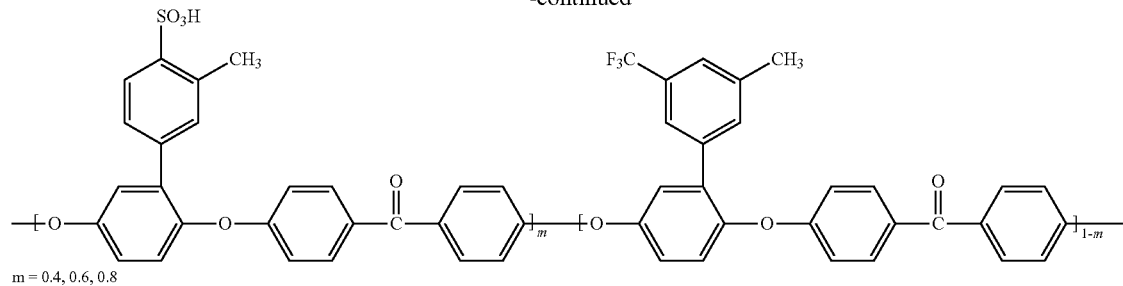

m = 0.4, 0.6, 0.8

Scheme 6 Preparation of copolymers with (4-sulfonic acid)phenyl side group.

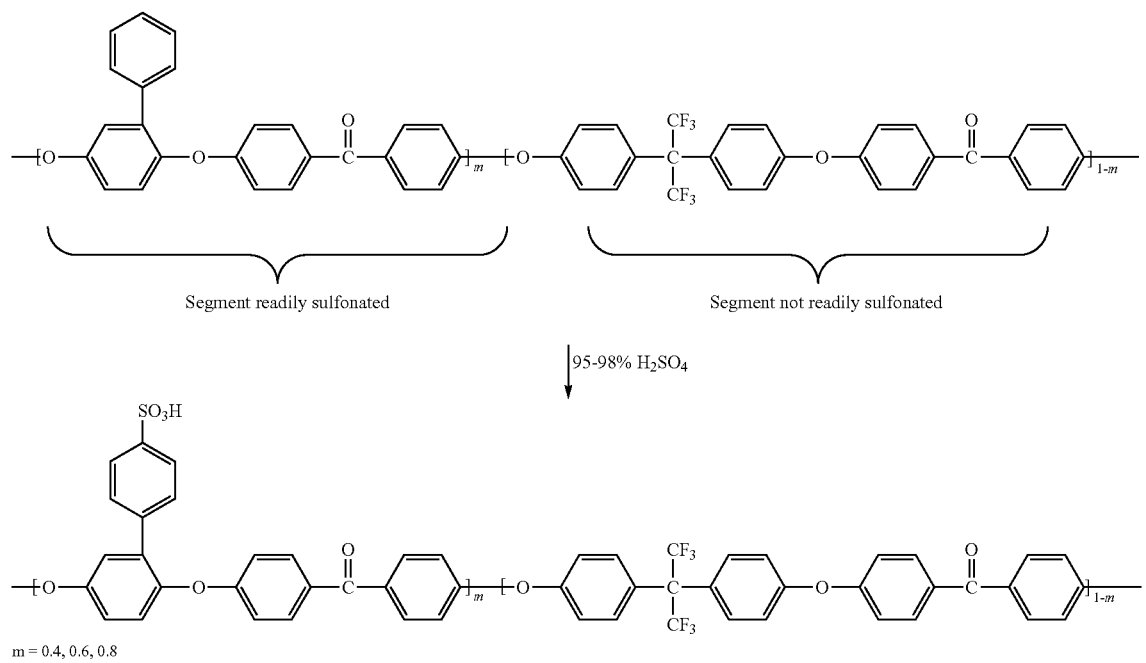

m = 0.4, 0.6, 0.8

FTIR spectroscopy is a convenient way to confirm the presence of sulfonated groups. In comparison with unsulfonated polymer starting materials, new absorption bands around 1029 and 1085 cm$^{-1}$ arise from symmetric and asymmetric stretching vibrations of sulfonic groups in sulfonated polymers were observed.

Figure 3:
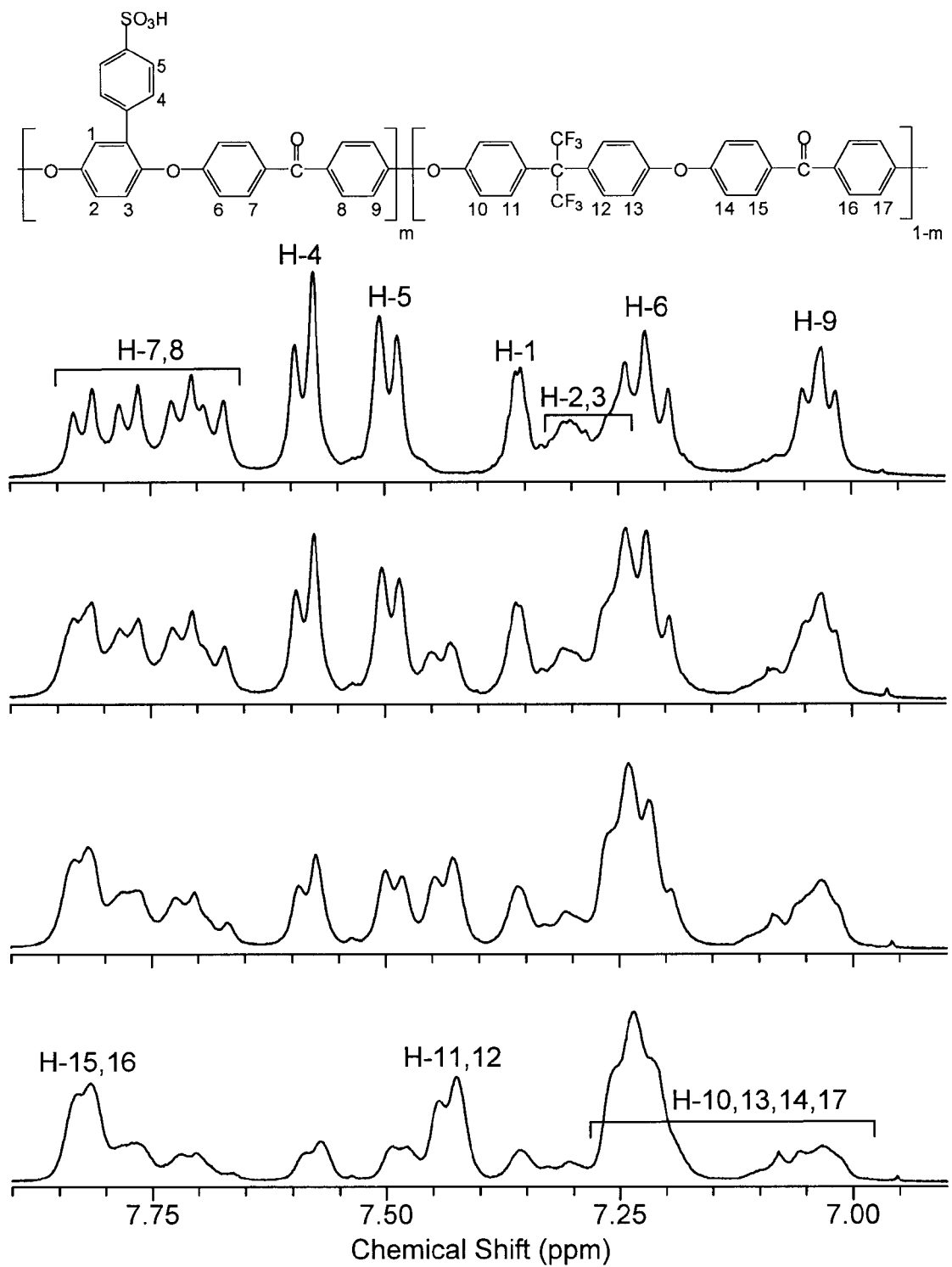
FIG. 3 depicts $^1$H NMR spectra for Ph-SPEEK and Ph-6FA-SPEEK-40, 60, 80.

FIG. 1 shows both $^1$H and $^{13}$C NMR spectra of sulfonated Ph-SPEEKK fully assigned. The simple NMR patterns of both spectra indicate full substitution of the hydrogen at the para-position of the pendent group by a sulfonic acid. This is also supported by the accurate peak integration values in $^1$H NMR which correspond to a fully substituted polymer. Furthermore, samples of unsulfonated and sulfonated polymers were prepared in a common solvent in which they were both soluble in: DMF-d$_7$. The spectra showed obvious changes in signal positions and peak intensities indicating full substitution had occurred. It was important to fully characterize the homopolymer and ascertain without doubt that substitution occurred because the copolymer spectra are complex, having broad lines which make complete characterization impractical. As an example, FIG. 3 shows stacked spectra of sulfonated Ph-6FA-SPEEK copolymers. One can observe the 6FA and the Ph monomer signals vary in intensities with the different stoichiometric ratios but it would be difficult from these spectra to confirm the presence of the sulfonic acid groups from post-sulfonation reaction. The top spectrum is of the sulfonated Ph-PEEK homopolymer and resembles that of the sulfonated Ph-PEEKK (FIG. 1) as expected from their similar structures.

Figure 2:
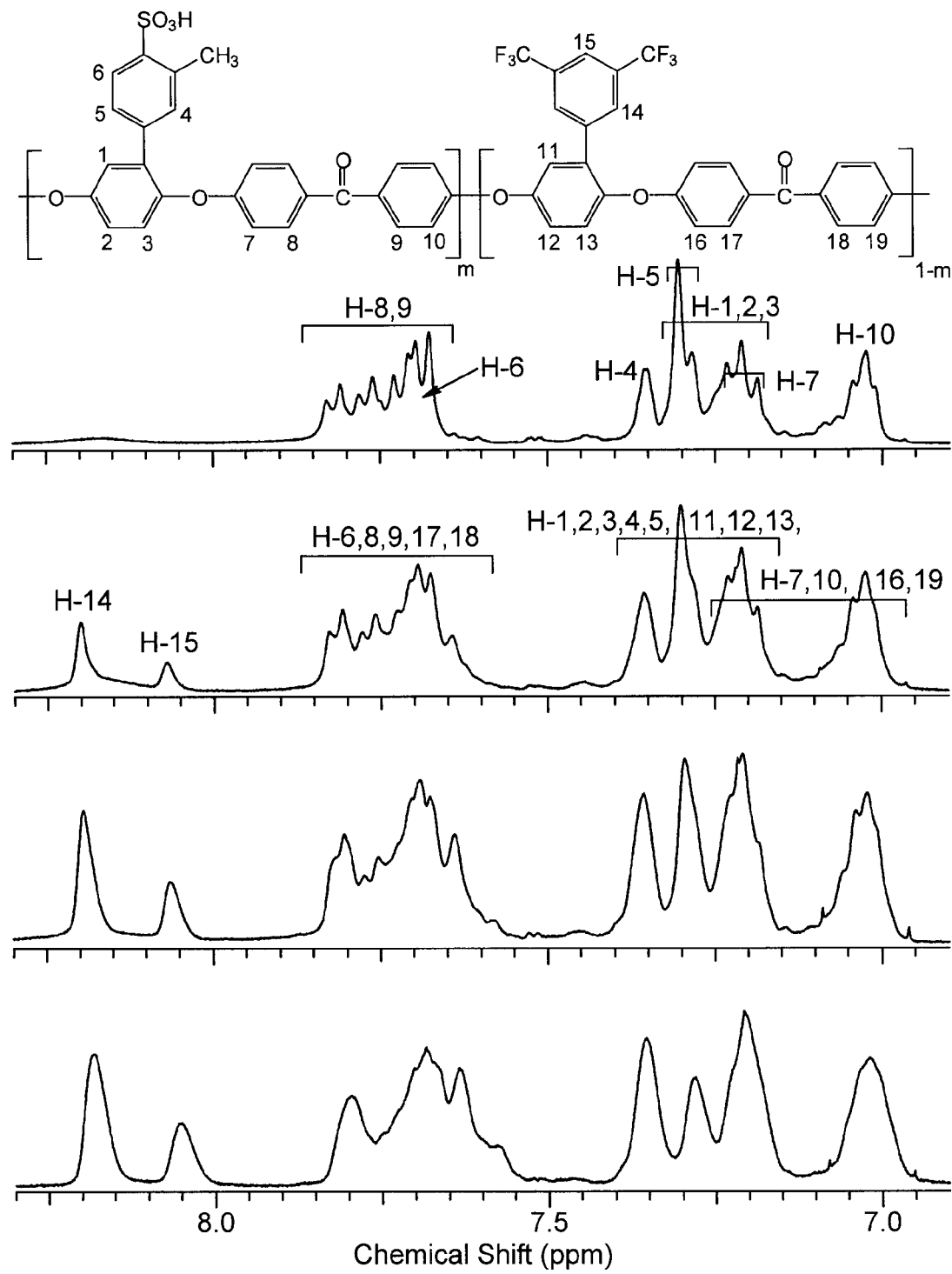
FIG. 2 depicts $^1$H NMR spectra for Me-SPEEK and Me-6F-SPEEK-40, 60, 80.
Figure 4:
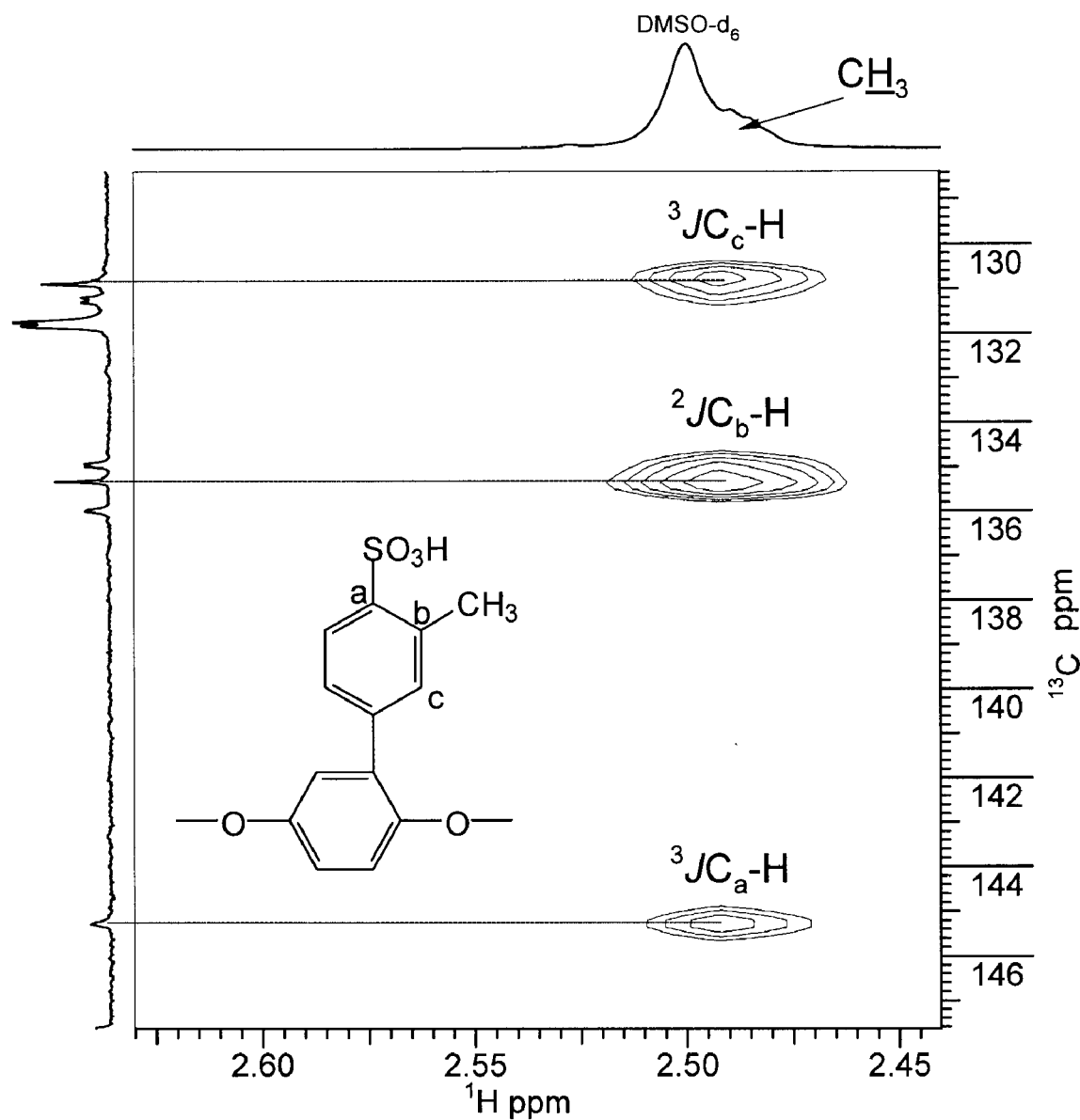
FIG. 4 depicts a 2D HMBC spectrum of Me-SPEEK.

FIG. 2 shows $^1$H NMR stacked spectra of sulfonated Me-6F-SPEEK copolymers and the sulfonated Me-SPEEK homopolymer with peak assignments. Once again, the homopolymer was fully characterized to ascertain the presence of a sulfonic acid and also its exact position on the phenyl ring. The sulfonated site was once again identified as the para position on the pendent phenyl ring. The 2D HMBC spectrum displayed in FIG. 4 clearly shows three multiple bond couplings between the hydrogen of the methyl group at 2.49 ppm and three carbon atoms at 145.3, 135.3 and 130.9 ppm. Of the three signals, only the carbon peak at 130.9 ppm is a CH, the other two are quaternary carbon atoms as determined by HSQC. Since one coupling is from $^2$JC$_b$-H (135.3 ppm), it leaves two other couplings for $^3$JC$_a$-H and $^3$JC$_c$-H. One of these carbon atoms is a CH carbon (C$_c$ at 130.9 ppm)

and the other is quaternary and is also at high frequency which is typical of carbon atoms attached to heteroatoms, hence $C_a$ at 145.3 ppm is C—$SO_3H$. It was also found from the $^1H$ NMR that sulfonic acid substitution was not 100%. The smaller aromatic signals in FIG. 2 and especially the second smaller $CH_3$ signal at 2.22 ppm (from DMSO-$d_6$) indicates that there could be un-substituted repeat units. That was confirmed, as it was previously done before with sulfonated Ph-SPEEKK, by running samples of unsulfonated and sulfonated polymers in a common solvent in which they were both soluble in: DMF-$d_7$. As expected, the un-substituted pendent group had a methyl signal at the exact same chemical shift as the smaller signal in the sulfonated polymer. The ratio of substituted to un-substituted repeat units was found to be 9:1 from the intensities of the two $CH_3$ signals in the sulfonated polymer $^1H$ spectrum, which meant that DS of Me-SPEEK was about 0.90.

Ion Exchange Capacity (IEC):

IEC is a method to indicate the exchangeable ions of polymer membranes, which offer an indirect method to evaluate the degree of sulfonation reaction. The IEC data from titration test were in the range of 2.23 to 0.84 mequiv/g, which were close to the expected values. Consequently, the DS values of this family of copolymers could be well controlled by their structural makeup. Thus, the DS could be expected from the ratios of feed ratios of monomers, which is a considerable advantage over the method controlled by reaction time and temperature.

Thermal Properties:

In order to maintain their good mechanical strength, polymer materials usually operate below the glass transition temperature ($T_g$). Higher temperature fuel cell operation thus demands PEM materials with high $T_g$.[41]

Only one transition temperature was found in the DSC curve before decomposition temperature for all the samples, which indicated their amorphous nature. For unsulfonated polymers, $T_g$ values were mainly affected by backbone rigidity. They were in the range of 145° C. to 186° C. mainly decided by their chain rigidity. In general, polymers had higher Tg values after sulfonation because of the introduction of polar sulfonic acid groups. They were in the range of 147° C. to 190° C., which determined by both the sulfonation contents and backbone rigidity.

Figure 5:
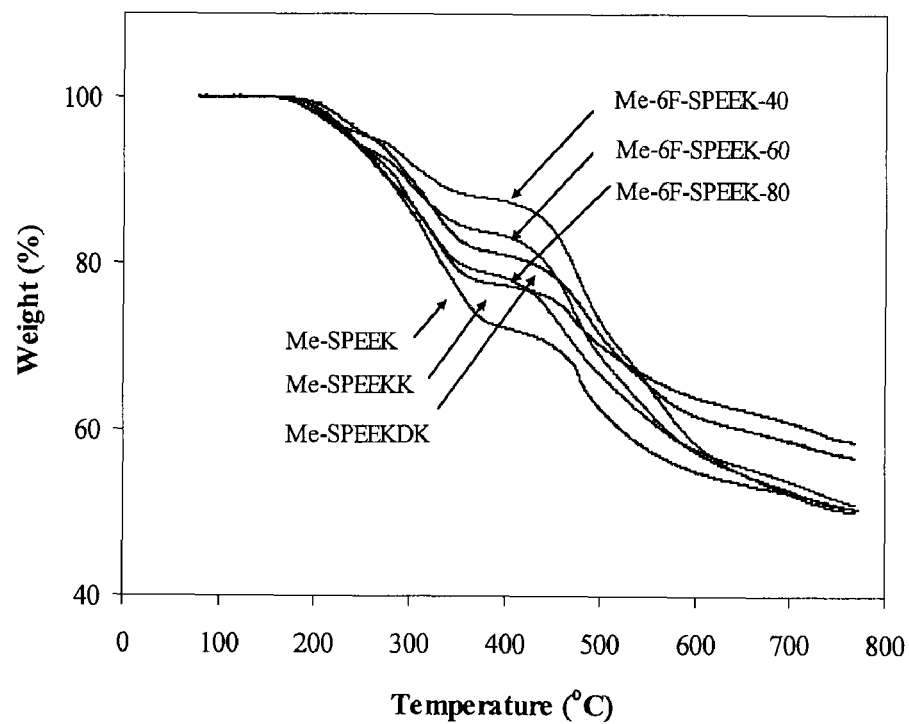
FIG. 5 depicts TGA curves for Me- and Ph-polymers after sulfonation.
Figure 5:
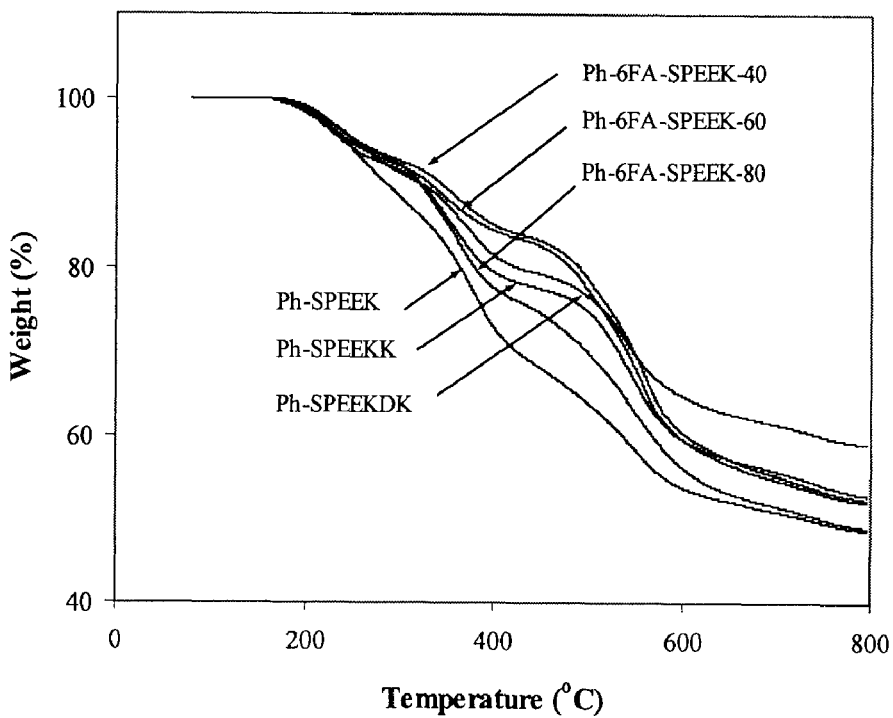

All the unsulfonated polymers showed excellent thermal stability judged by their TGA curves. After sulfonation, the thermal decomposition temperatures went down to around 202 to 214° C. because of the introduction of sulfuric acid groups. As shown in FIG. 5, the first decomposition stage around 210° C. was possibly associated with the loss of water and degradation of the sulfonic acid groups, and the second decomposition stage around 500° C. was related to the degradation of the main chains.

Oxidative Stability:

The oxidative stability of the polymers was evaluated in Fenton's reagent at 80° C. This method is regarded as one of the standard tests to gauge relative oxidative stability and to simulate accelerated fuel cell operating conditions.[42] It has been known that the oxidative attack by HO• and HOO• radicals mainly occurs in the hydrophilic domains to cause the degradation of polymer chains. It is expected that side-chain-acid polymers have improved oxidative resistance over main-chain-substituted sulfonic acid polymers. All the polymers except Me-SPEEK and Ph-SPEEK exhibited excellent oxidative stability. Their weight was retained above 94% after treatment in Fenton's reagent at 80° C. for 1 h, and they did not dissolve in Fenton's reagent after 2.0 h treatment at 80° C. As expected, the polymers with the higher EW had the better oxidative stability. Me-SPEEKDK, Ph-SPEEKDK, Me-6F-SPEEK-40 and Ph-6FA-SPEEK-40 maintained dimensional shapes and flexibility even after 6 h treatment, which suggested their outstanding oxidative stability. The oxidative resistance of these polymers was much better than reported analogues with similar IEC values and comparable to Nafion 117.

Mechanical Properties:

Good mechanical properties of the PEMs in either the anhydrous or hydrous states are one of necessary demands for their applications. A comparison of the novel membranes with side-chain acid substituents and Nafion 117 were tested and are listed in Table 3.

Figure 6:
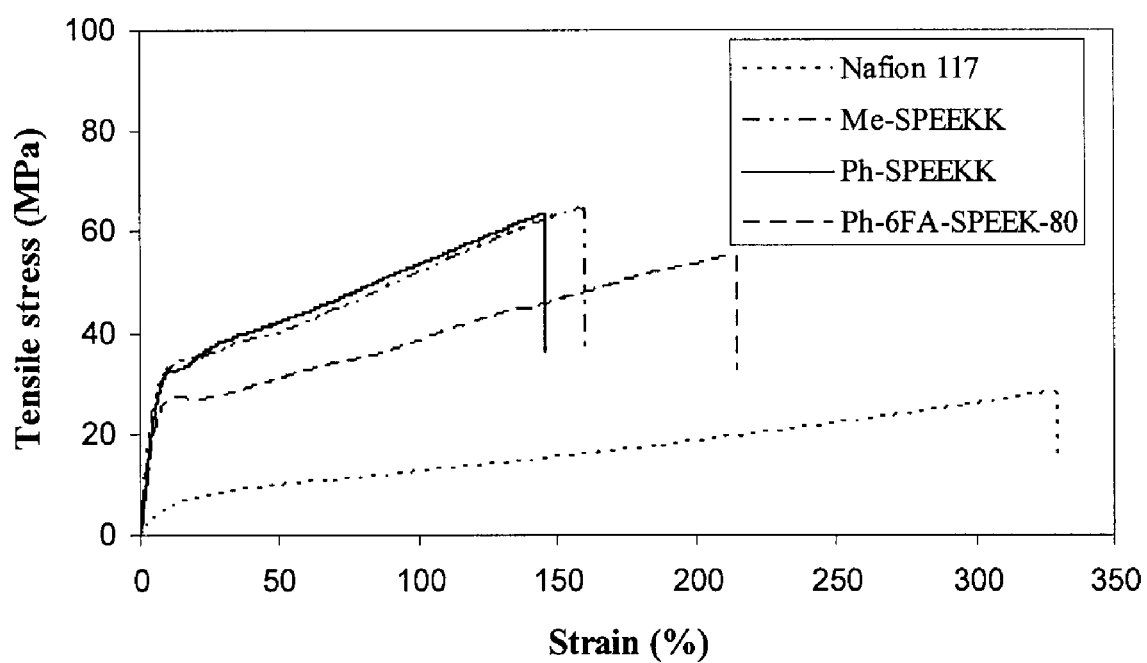
FIG. 6 depicts stress vs. strain curves of PEKs membranes in a wet state.

The samples in the dry state had tensile stress at maximum load of 77.9 to 110 MPa, Young's moduli of 1.53 to 2.17 GPa, and elongation at break of 9.9 to 73.9%. In the wet state, the samples showed excellent mechanical properties with tensile stress of 42.6 to 64.5 MPa and Young's moduli of 0.32 to 1.41 GPa. Especially, their elongations at break were up to 75.3 to 214.1%, which showed they were very flexible materials. As shown in FIG. 6, these materials showed much higher tensile strength and the lower elongation than Nafion 117. The tension results in both dry and wet states undoubtedly showed they were strong and flexible membrane materials.

TABLE 3

Mechanical properties of the sulfonated polymers.

| polymer | tensile strength (MPa) | | Young's modulus (GPa) | | elongation at break (%) | |
| --- | --- | --- | --- | --- | --- | --- |
| | dry | wet | dry | wet | dry | wet |
| Me-SPEEK | 79.6 | 64.5 | 1.53 | 0.72 | 22.3 | 159.0 |
| Me-SPEEKK | 110.0 | 42.6 | 2.03 | 0.40 | 20.9 | 204.5 |
| Me-SPEEKDK | 98.0 | 59.5 | 1.92 | 0.85 | 13.3 | 114.7 |
| Ph-SPEEK | 87.0 | 45.6 | 1.76 | 0.32 | 9.9 | 183.8 |
| Ph-SPEEKK | 103.2 | 63.6 | 2.15 | 0.60 | 10.4 | 145.1 |
| Ph-SPEEKDK | 88.6 | 64.1 | 2.12 | 0.70 | 52.0 | 128.3 |
| Me-6F-SPEEK-40 | 107.3 | 60.1 | 1.93 | 1.41 | 10.3 | 75.3 |
| Me-6F-SPEEK-60 | 106.2 | 52.0 | 2.03 | 0.77 | 15.5 | 85.4 |
| Me-6F-SPEEK-80 | 101.2 | 51.0 | 2.17 | 0.67 | 13.4 | 80.9 |
| Ph-6FA-SPEEK-40 | 77.9 | 61.3 | 1.80 | 0.95 | 52.9 | 134.9 |
| Ph-6FA-SPEEK-60 | 103.8 | 61.2 | 2.06 | 0.67 | 22.5 | 138.0 |
| Ph-6FA-SPEEK-80 | 91.6 | 55.5 | 1.73 | 0.52 | 73.9 | 214.1 |
| Nafion 117[a] | 38.0 | 28.4 | 0.18 | 0.10 | 301.5 | 329.2 |

Figure 7:
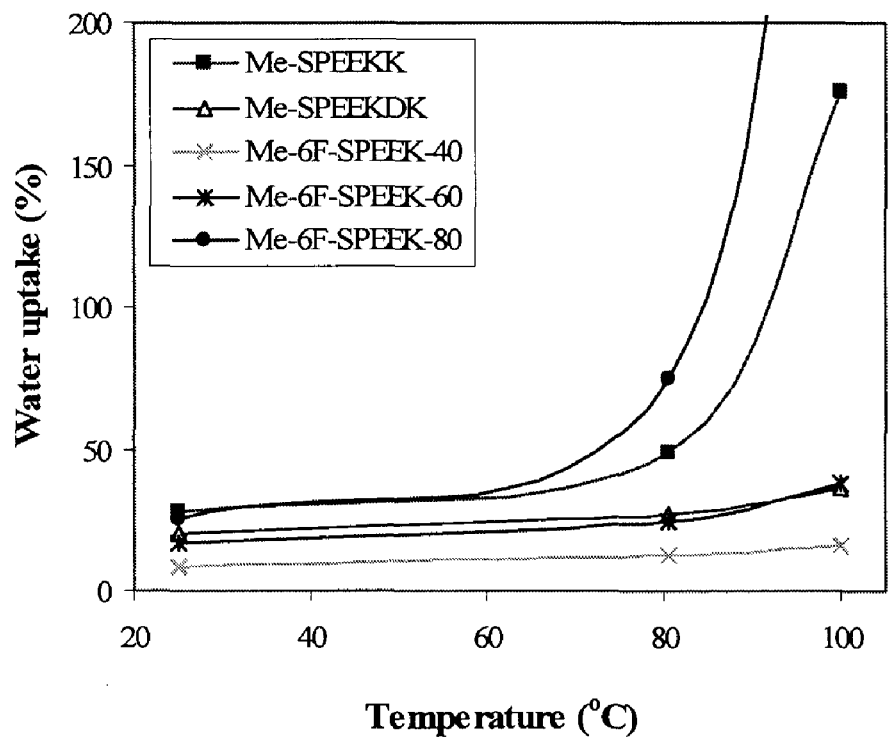
FIG. 7 depicts water uptake of PEK membranes at different temperature.
Figure 7:
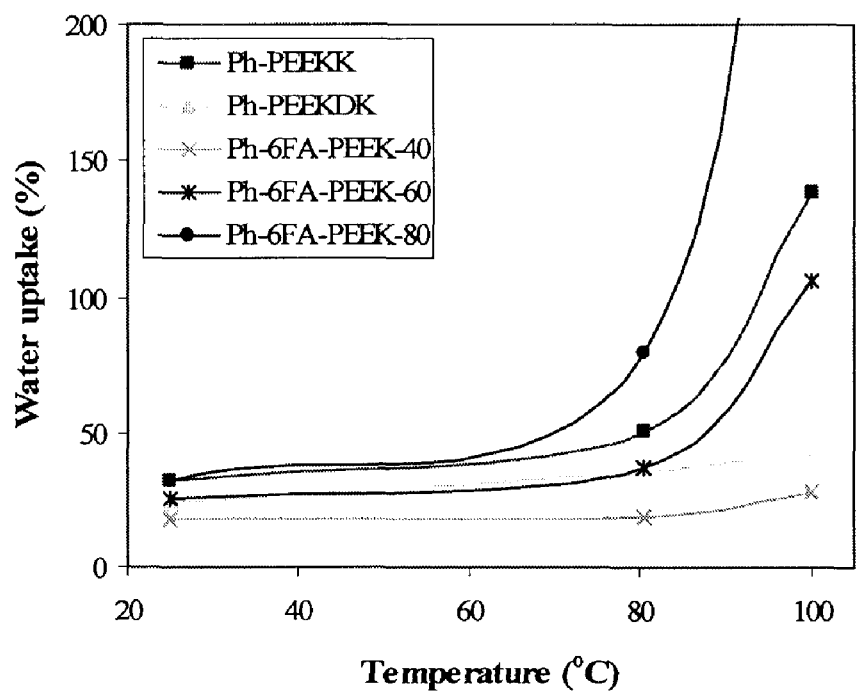
Figure 8:
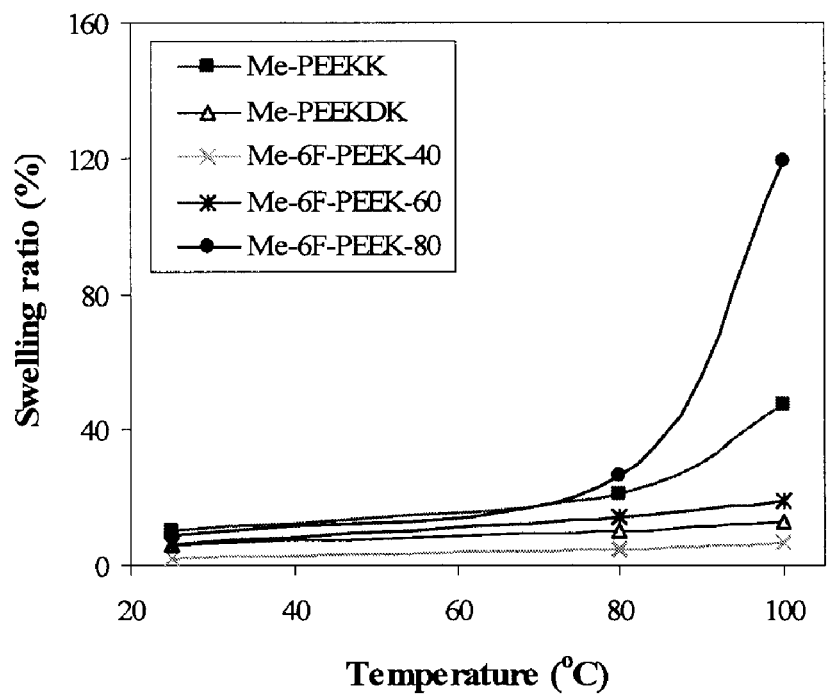
FIG. 8 depicts swelling ratio of PEK membranes at different temperatures.
Figure 8:
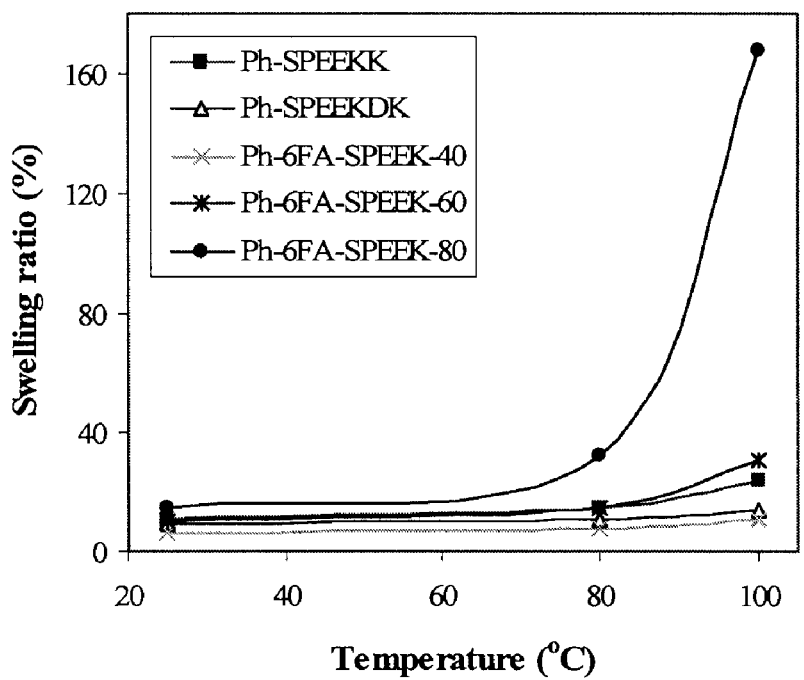

Water Uptakes and Swelling Ratios:

Water uptake and swelling ratios of PEMs are closely related to IEC, proton conductivity, dimensional stability, and mechanical strength. The water within the membrane provides a carrier for the proton, and maintains high proton conductivity. However, excessive water uptake in a PEM leads to unacceptable dimensional change or loss of dimensional shape, which could lead to weakness or a dimensional mismatch when incorporated into a Membrane Electrode Assembly (MEA).[3] Therefore, the preparation of sulfonated polymers with ideal water uptakes and dimensional stability is one of the critical demands for their application as PEMs. The water uptake and swelling ratios of PEKs membranes were measured at different temperatures, and the results are shown in FIGS. 7 and 8.

Compared with previously reported main-chain-acid PEK copolymers, these series of side-chain-acid obviously had lower water uptakes and swelling ratios.[3] Swelling ratios of homopolymers, Me-SPEEKDK and Ph-SPEEKDK, were about 15% even at 100° C. It was interesting to note that Me-6F-SPEEK-80 and Ph-6FA-PEEK-80 with the similar IEC values with above homopolymers had extremely high water uptakes and swelling ratios although they showed comparable values to the homopolymers at room temperature.

TABLE 4

Methanol permeability, proton conductivity and oxidative stability.

| polymer | methanol permeability ($cm^2/s$) | oxidative stability | | σ (S/cm) | |
| --- | --- | --- | --- | --- | --- |
| | | RW (%) | t (h) | 30° C. | 100° C. |
| Me-SPEEK | $7.43 \times 10^{-7}$ | — | — | 0.049 | 0.158 |
| Me-SPEEKK | $2.28 \times 10^{-7}$ | 97 | 2.5 | 0.033 | 0.154 |
| Me-SPEEKDK | $9.55 \times 10^{-8}$ | 98 | >6.0 | 0.021 | 0.080 |
| Ph-SPEEK | $1.05 \times 10^{-6}$ | — | — | 0.060 | 0.182 |
| Ph-SPEEKK | $3.31 \times 10^{-7}$ | 98 | 2.0 | 0.038 | 0.151 |
| Ph-SPEEKDK | $2.30 \times 10^{-7}$ | 99 | >6.0 | 0.023 | 0.088 |
| Me-6F-SPEEK-40 | $2.54 \times 10^{-8}$ | 98 | >6.0 | 0.006 | 0.023 |
| Me-6F-SPEEK-60 | $5.54 \times 10^{-7}$ | 97 | 4.5 | 0.009 | 0.050 |
| Me-6F-SPEEK-80 | $1.91 \times 10^{-7}$ | 94 | 2.0 | 0.032 | 0.172 |
| Ph-6FA-SPEEK-40 | $6.66 \times 10^{-8}$ | 98 | >6.0 | 0.009 | 0.040 |
| Ph-6FA-SPEEK-60 | $2.05 \times 10^{-7}$ | 97 | 2.5 | 0.012 | 0.058 |
| Ph-6FA-SPEEK-80 | $5.28 \times 10^{-7}$ | 95 | 2.0 | 0.027 | 0.109 |
| Nafion 117 | $1.55 \times 10^{-8}$ | 98 | >6.0 | 0.078 | 0.138 |

Figure 9:
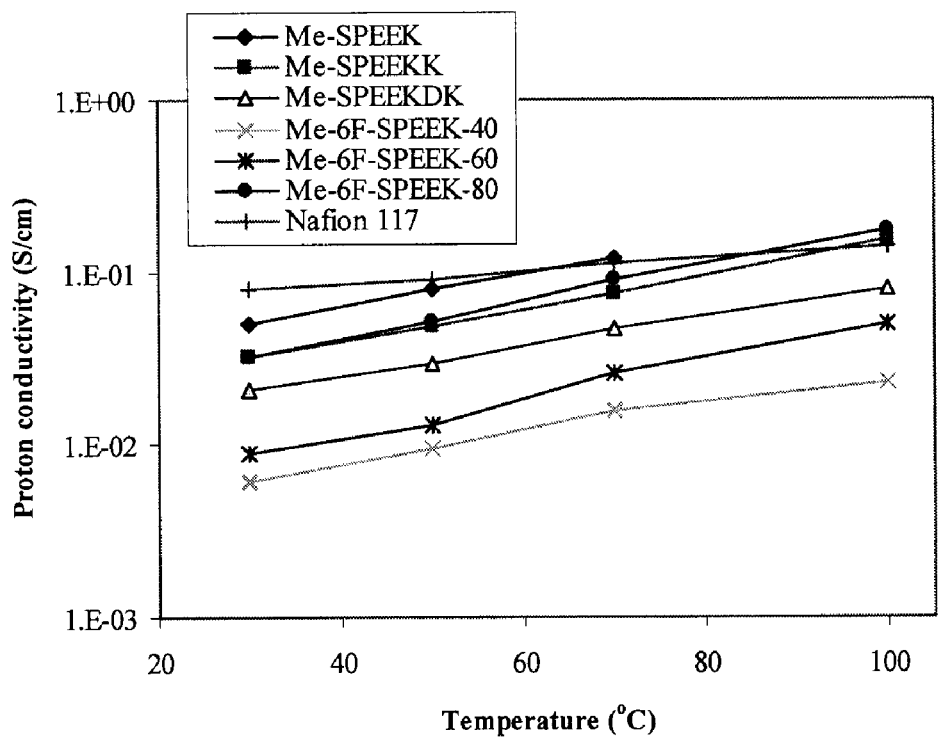
FIG. 9 depicts proton conductivities of PEK membranes and Nafion 117.
Figure 9:
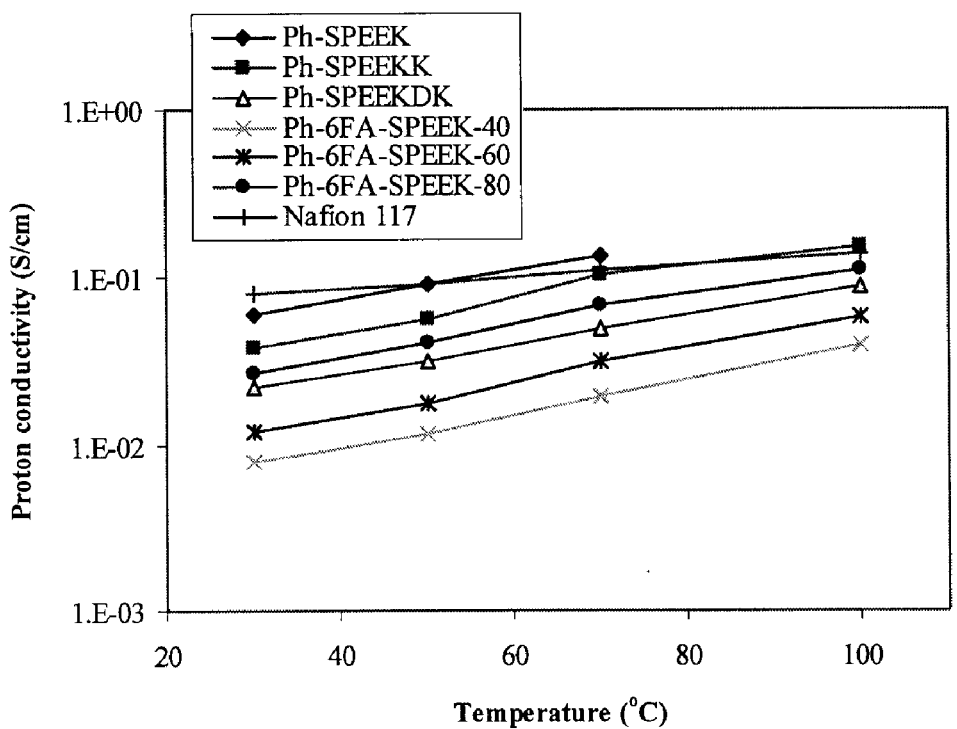

Proton Conductivities and Methanol Permeability:

The proton conductivities of the membranes were estimated using Impedance diagrams, acquired in the frequency range of 1 to $10^7$ Hz. The results at different temperature are presented in FIG. 9. The figure shows that the conductivities of all the samples increase with temperature and if one traces the isotherms of the conductivity, they approximately increase with SC. With the exception of Me-6F-SPEEK-40 and Ph-6FA-SPEEK-40, all the other samples exhibited room temperature conductivities higher than $1 \times 10^{-2}$ S/cm. Me-SPEEKK, Ph-SPEEKK and Me-6F-SPEEK-80 membranes exhibited proton conductivities comparable to that of Nafion 117 above 80° C. Undoubtedly, PEMs with high proton conductivity and low swelling ratio will be attractive for fuel cell application. Proton conductivities of Me-SPEEKK and Ph-SPEEKK were as high as 0.154 and 0.151 at 100° C., respectively, surpassing the value of 0.138 S/cm of Nafion 117. Meanwhile, they still showed relatively low swelling ratios, which meant they were dimensionally stable in hot water. Me-PEEK and Ph-SPEEK exhibited higher proton conductivity, but its applicability in FC is limited by its poor dimensional stability in hot water.

Figure 10:
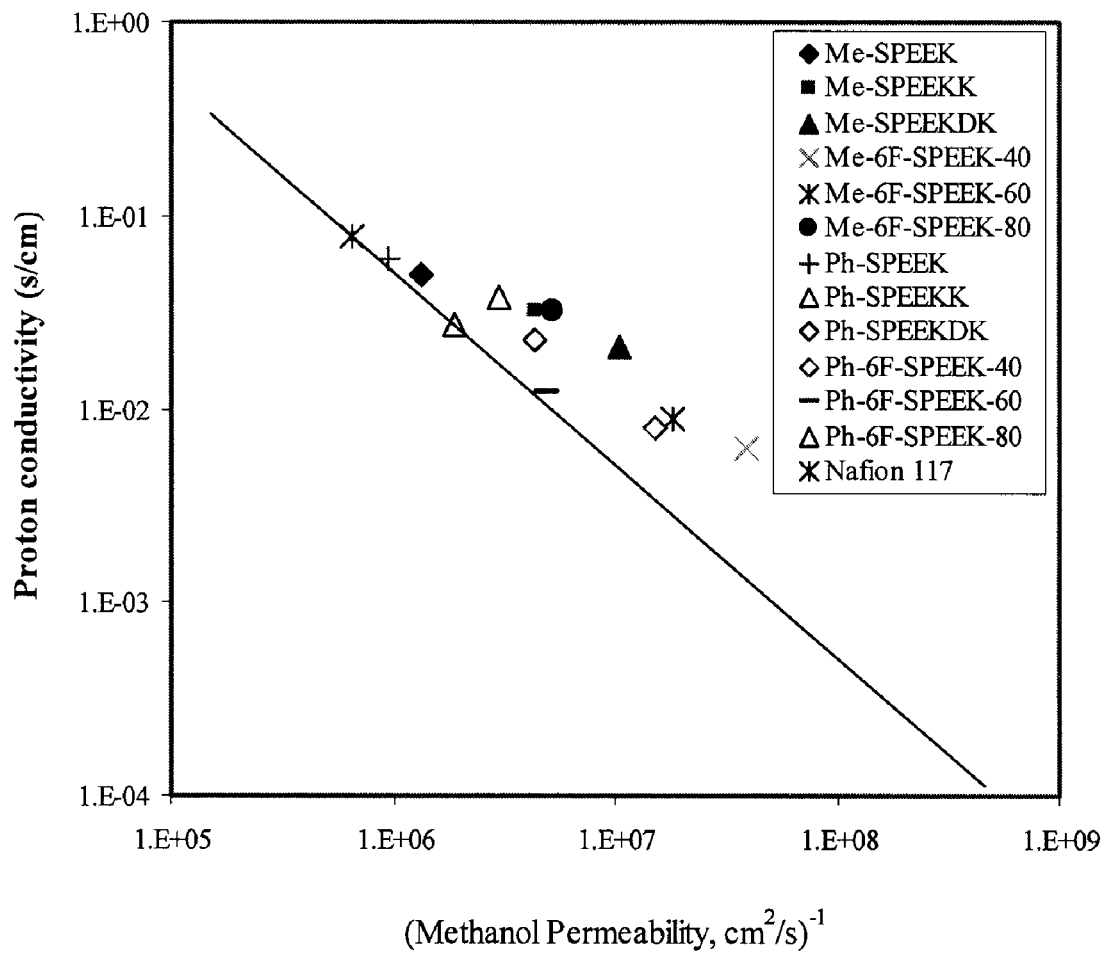
FIG. 10 depicts methanol permeability vs. proton conductivities of the membranes and Nafion 117.

Membranes intended for direct methanol FC (DMFC) must both possess high proton conductivity and to be an effective barrier for methanol crossover from the anode to the cathode compartment.[43] Among the most significant of Nafion's drawbacks is its high methanol crossover in the DMFC application. This limitation is associated with the microstructure of Nafion, where interconnected ionic domains strongly contribute to its high proton conductivity, but at the same time contribute to fast methanol diffusion. The PEK membranes containing the ketone diphenyl ketone moiety (Ph-SPEEKDK and Me-SPEEKDK) exhibited extremely low methanol diffusion, which was beneficial from their well refined microstructure caused by regular and rigid backbone molecular structure. As shown in FIG. 10, the methanol permeability values of Me-SPEEKK, Me-SPEEKDK, Ph-SPEEKK and Ph-SPEEKDK at room temperature were in the range of $3.31 \times 10^{-7}$ to $9.55 \times 10^{-8}$ $cm^2/s$, which is several times lower than the value of Nafion 117 of $1.55 \times 10^{-6}$ $cm^2/s$. Combined with all the other relative properties, Ph-SPEEKDK and Me-SPEEKDK were the promising materials for DMFC applications. Table 4 provides oxidative stability and methanol permeability value for various polymers.

PEKs with phenyl, including substituted phenyl, pendent side groups provide excellent materials for proton exchange membranes. PEKs with phenyl and 3-methylphenyl pendent groups were are of particular note, and have been found to have controlled sulfonation sites with single substituted sulfonic acid per repeated unit via post-sulfonation approach under an extremely mild reaction condition. A family of both homo- and co-polymers with ion exchange capacity of 2.23-0.84 mequiv/g could readily prepared by controlling the length of unsulfonated segments. These side-chain sulfonation polymers have excellent mechanical properties, high glass transition temperatures, good thermal and oxidative stability, as well as good dimensional stability in hot water. The methanol permeability values of Me-SPEEKDK and Ph-SPEEKDK were in the range of $9.55 \times 10^{-8}$, $2.30 \times 10^{-7}$ $cm^2/s$, which is several times lower than Nafion 117. Me-SPEEKK and Ph-SPEEKK also exhibited high proton conductivity of 0.15 S/cm at 100° C., which is even higher than 0.13 S/cm of Nafion 117. The results showed that some of them are good PEM materials for PEMFC and DMFC applications.

Figure 11A:
FIG. 11 depicts TEM photographs of Me-SPEEK (a) and Me-SPEEKK (b) (scale bars=0.2 μm)
Figure 11B:
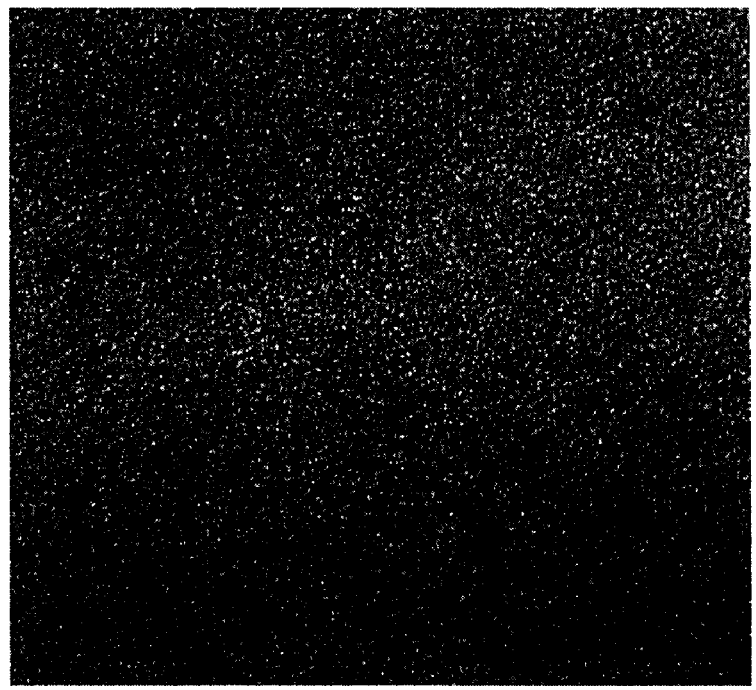

Microstructure of Membranes:

Two-phase separation morphology has been observed in the microstructure of Nafion and polyimide films.[44,45] Proton conductivity and dimensional stability of the membranes are closely related to their morphology. Wide ion channels formed by hydrophilic domains are helpful to the movement of protons, but are possibly detrimental for mechanical properties and dimensional stability in hot water. The microstructure of the present membranes was studied by TEM, as shown in FIG. 11. In the image of highly sulfonated Me-SPEEK (FIG. 11*a*), small black clusters (about 20 nm) corresponding to hydrophilic domains dispersing among white continuous area (hydrophobic domains) were observed. However, no obvious phase-separation was observed for the samples with lower IEC values, such as Me-SPEEKK (FIG. 11*b*), which well supported their behaviors of good hot water stability and low methanol permeability.

Use of Membranes in Fuel Cell Applications:

Membranes of Ph-SPEEKK and Ph-SPEEKDKD (Scheme 4) were prepared by casting using DMAc solution (solid content=about 5%). Membrane electrode assemblies (MEAs) for each type of membrane were prepared using a direct painting method.[46] The Ph-SPEEKDK sample exhibited some wetting issues with Nafion catalyst ink, so anode painting was difficult in some instances.

Figure 12:
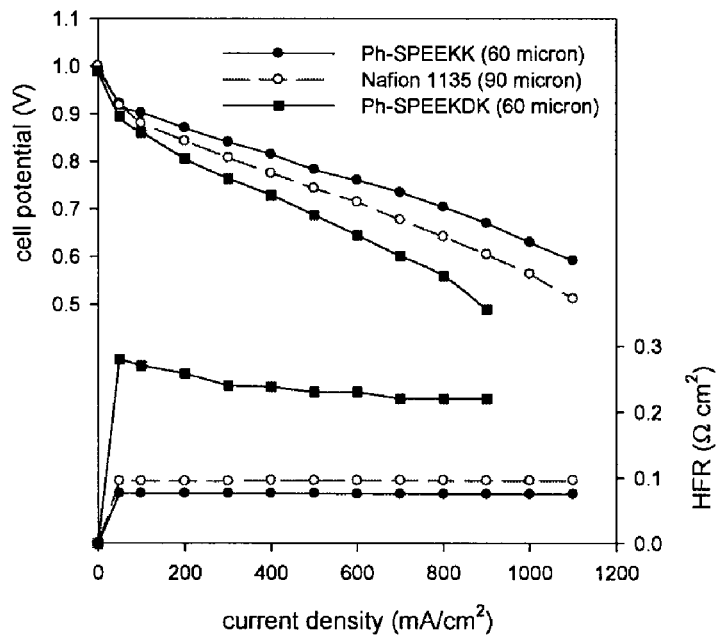
FIG. 12 depicts performance of Ph-SPEEKK and Ph-SPEEKDK compared with Nafion 1135 in H$_2$/air fuel cells.

Hydrogen/air fuel cell performance of each copolymer was tested after a 2 hour break-in period. The test conditions were as follows: anode=Pt—Ru 8 mg/$cm^2$; cathode=Pt 6 mg/$cm^2$; cell temperature=80° C.; anode temperature=105° C.; cathode temperature=70° C.; hydrogen flow rate=200 sccm; air flow rate=500 sccm; back pressure=20 psig; cell hardware=5 $cm^2$. FIG. 12 compares the $H_2$/air fuel cell performance of Ph-SPEEKK, Ph-SPEEKDK, and Nafion 1135. The performance of Ph-SPEEKK (60 micron thick) is superior to Nafion (90 micron thick) and Ph-PEEKDK (60 micron thick).

Figure 13:
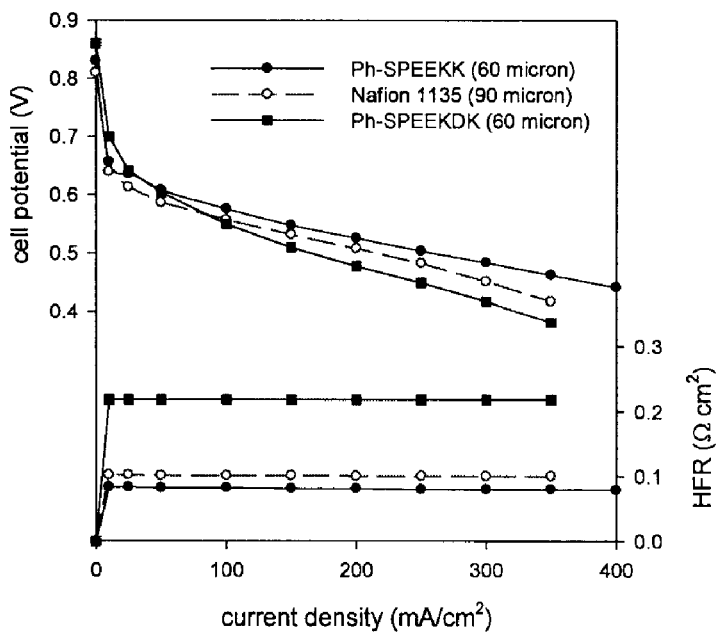
FIG. 13 depicts DMFC performance of Ph-SPEEKK and Ph-SPEEKDK compared with Nafion 1135 for 0.5 M methanol feed.
Figure 14A:
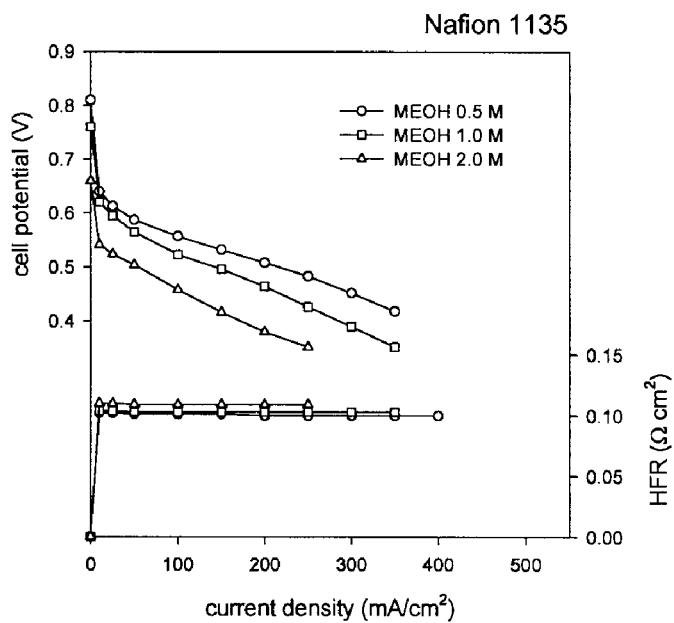
FIG. 14a depicts effect of methanol feed concentration for Nafion 1135 on DMFC performance; and, FIG. 14b depicts effect of methanol feed concentration for Ph-SPEEKK on DMFC performance.
Figure 14B:
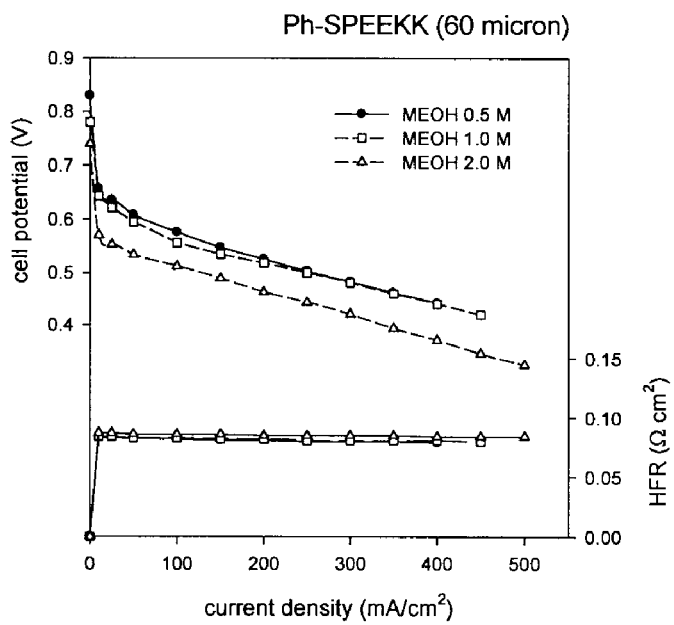

Direct methanol fuel cell (DMFC) performance of each copolymer was tested. The test conditions were as follows: cell temperature=80° C.; cathode temperature=90° C.; methanol feed concentration=0.5 M; methanol feed rate=1.8 ml/sec; air flow rate=500 sccm; cell hardware=5 $cm^2$. FIG. 13 shows the DMFC performance of Ph-SPEEKK and Ph-SPEEKDK copolymers compared to Nafion 1135. Ph-SPEEKK showed excellent performance. The improved performance of Ph-SPEEKK may be due to the combination effect of low cell resistance and low methanol crossover. FIG. 14 shows DMFC performance as a function of methanol feed concentration for Nafion 1135 (FIG. 14*a*) and Ph-SPEEKK (FIG. 14b). For Nafion 1135 membrane, 0.3-0.5 M is the optimum methanol feed concentration at 80° C., while the optimum methanol feed concentration of low methanol permeable Ph-SPEEKK membrane is about 1 M.

REFERENCES

The following references are herein incorporated by reference.
(1) Steele, B. C. H.; Heinzel, A. *Nature* 2001, 414, 345.
(2) Rikukawa, M.; Sanui, K. *Prog. Polym. Sci.* 2000, 25, 1463.
(3) Hickner, M. A.; Ghassemi, H.; Kim, Y. S.; Einsla, B. R.; McGrath, J. E. *Chem. Rev.* 2004, 104, 4587.
(4) Roziere, J.; Jones, D. J. *Ann. Rev. Mater. Res.* 2003, 33, 503.
(5) Wang, F.; Hickner, M.; Kim, Y. S.; Zawodzinski, T. A.; McGrath, J. E. *J. Membr. Sci.* 2002, 197, 231.
(6) Yang, Y.; Holdcroft, S. *Fuel Cells* 2005, 5, 171.
(7) Kerres, J. A. *J. Membr. Sci.* 2001, 185, 3.
(8) Nolte, R.; Ledjeff, K.; Bauer, M.; Mülhaupt, R. *J. Membr. Sci.* 1993, 83, 211.
(9) Miyatake, K.; Chikashige, Y.; Watanabe, M. *Macromolecules* 2003, 36, 9691.
(10) Fang, J. H.; Guo, X. X.; Harada, S.; Watari, T.; Tanaka, K.; Kita, H.; Okamoto, K. *Macromolecules* 2002, 35, 9022.
(11) Miyatake, K.; Asano, N.; Watanabe, M. *J. Polym. Sci., Part: A Polym. Chem.* 2003, 41, 3901.
(12) Genies, C.; Mercier, R.; Sillion, B.; Cornet, N.; Gebel, G.; Pineri, M. *Polymer* 2001, 42, 359.
(13) Powers, E. J.; Serad, G. A. *High Performance Polymers: Their Origin and Development*; Elsevier: Amsterdam, 1986; p 355.
(14) Wang, L.; Meng, Y. Z.; Wang, S. J.; Shang, X. Y.; Li, L.; Hay, A. S. *Macromolecules*, 2004, 37, 3151
(15) Miyatake, K.; Oyaizu, K.; Tsuchida, E.; Hay, A. S. *Macromolecules,* 2001, 34, 2065.
(16) Kobayashi, T.; Rikukawa, M.; Sanui, K.; Ogata, N. *Solid State Ionics* 1998, 106, 219.
(17) Ghassemi, H.; McGrath, J. E. *Polymer* 2004, 45, 5847.
(18) Jones, D. J.; Rozière, J. *J. Membr. Sci.* 2001, 185, 41.
(19) Ding, J.; Chuy, C.; Holdcroft, S. *Macromolecules* 2002, 35, 1348.
(20) Cassidy, P. E.; Aminabhavi, T. M.; Farley, J. M. *J. Macrom. Sci., Rev. Macromol. Chem. and Phys.,* 1989, C29, 365.
(21) Rao, V. L. *J. Macrom. Sci., Rev. Macromol. Chem. and Phys.,* 1995, C35, 661.
(22) Genova-Dimitrova, P.; Baradie, B.; Foscallo, D.; Poinsignon, C.; Sanchez, J. Y. *J. Membr. Sci.* 2001, 185, 59.
(23) Al-Omran, A.; Rose, J. B. *Polymer* 1996, 37, 1735.
(24) Lafitte, B.; Karlsson, L. E.; Jannasch, P. *Macromol. Rapid Commun.* 2002, 23, 896.
(25) Kerres, J.; Cui, W.; Richie, S. *J. Polym. Sci., Part A: Polym. Chem.* 1996, 34, 2421.
(26) Ueda, M.; Toyota, H.; Ochi, T.; Sugiyama, J.; Yonetake, K.; Masuko, T.; Teramoto, T. *J. Polym. Sci., Polym. Chem. Ed.* 1993, 31, 853.
(27) Wang, F.; Hickner, M.; Kim, Y. S.; Zawodzinski, T. A.; McGrath, J. E. *J. Membr. Sci.* 2002, 197, 231.
(28) Wang, F.; Chen, T.; Xu, J. *Macromol. Chem. Phys.* 1998, 199, 1421. (26)
(29) Miyatake, K.; Oyaizu, K.; Tsuchida, E.; Hay, A. S. *Macromolecules* 2001, 34, 2065.
(30) Miyatake, K.; Hay, A. S. *J. Polym. Sci., Part A: Polym. Chem.* 2001, 39, 3211.
(31) Lafitte, B.; Puchner, M.; Jannasch, P. *Macromol. Rapid Commun.* 2005, 26, 1464.
(32) Yin, Y.; Yamada, O.; Suto, Y.; Mishima, T.; Tanaka, K.; Kita, H.; Okamoto, K. *J. Polym. Sci., Polym. Chem.* 2005, 43, 1545.
(33) Chen, S.; Yin, Y.; Tanaka, K.; Kita, H.; Okamoto, K. *Polymer* 2006, 47 2660.
(34) Yasuda, T.; Li, Y.; Miyatake, K.; Hirai, M.; Nanasawa, M.; Watanabe, M. *J. Polym. Sci. Part A: Polym. Chem.*, 2006, 44, 3995.
(35) Liu, B. J.; Hu, W.; Chen, C. H.; Jiang, Z. H.; Zhang, W. J.; Wu, Z. W.; Matsumoto, T. *Polymer* 2004, 45, 3241.
(36) Liu, B. J.; Wang, G. B.; Hu, W.; Jin, Y. H.; Chen, C. H.; Jiang, Z. H.; Zhang, W. J.; Wu, Z. W.; Wei, Y. *J. Polym. Sci., Part A: Polym. Chem.,* 2002, 40, 3392.
(37) Cotter, R. J. *Engineering Plastics: Handbook of Polyarylethers*; Gordon & Breach: Switzerland, 1995.
(38) Shibuya, N.; Porter, R. S. *Macromolecules,* 1992, 25, 6495.
(39) Bishop, M. T.; Karasz, F. E.; Russo, P. S.; Langley, K. H. *Macromolecules* 1985, 18, 86.
(40) Bailly, C.; Williams, D. J.; Karasz, F. E.; MacKnight, W. J. *Polymer* 1987, 28, 1009.
(41) Fujimoto, C.; Hickerner, M.; Cornelius, C.; Loy, D. *Macromolecules* 2005, 38, 5010.
(42) Xing, P. X.; Robertson, G. P.; Guiver, M. D.; Mikhailenko, S. D.; Kaliaguine, S. *Macromolecules,* 2004, 37, 7960.
(43) Pivovar, B. S.; Wang, Y. X.; Cussler, E. L. *J. Membr. Sci.,* 1999, 154, 155.
(44) Kreuer, K. D. *J. Membr. Sci.* 2001, 185, 29.
(45) Asano, N.; Aoki, M.; Suzuki, S.; Miyatake, K.; Uchida, H.; Watanabe, M. *J. Am. Chem. Soc.* 2006, 128, 1762.
(46) Y. S. Kim et al. *J. Electrochem. Soc.* 151, A2150, 2004.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A sulfonated poly(aryl ether) of formula (I) or a salt thereof:

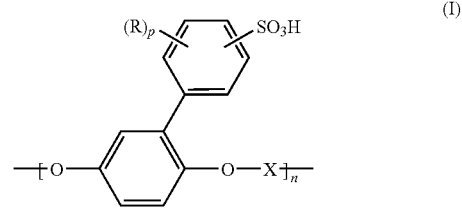

wherein X is

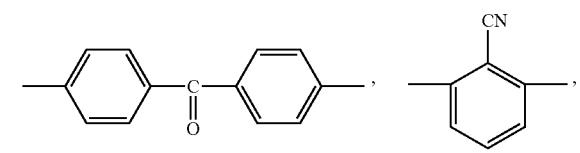

-continued

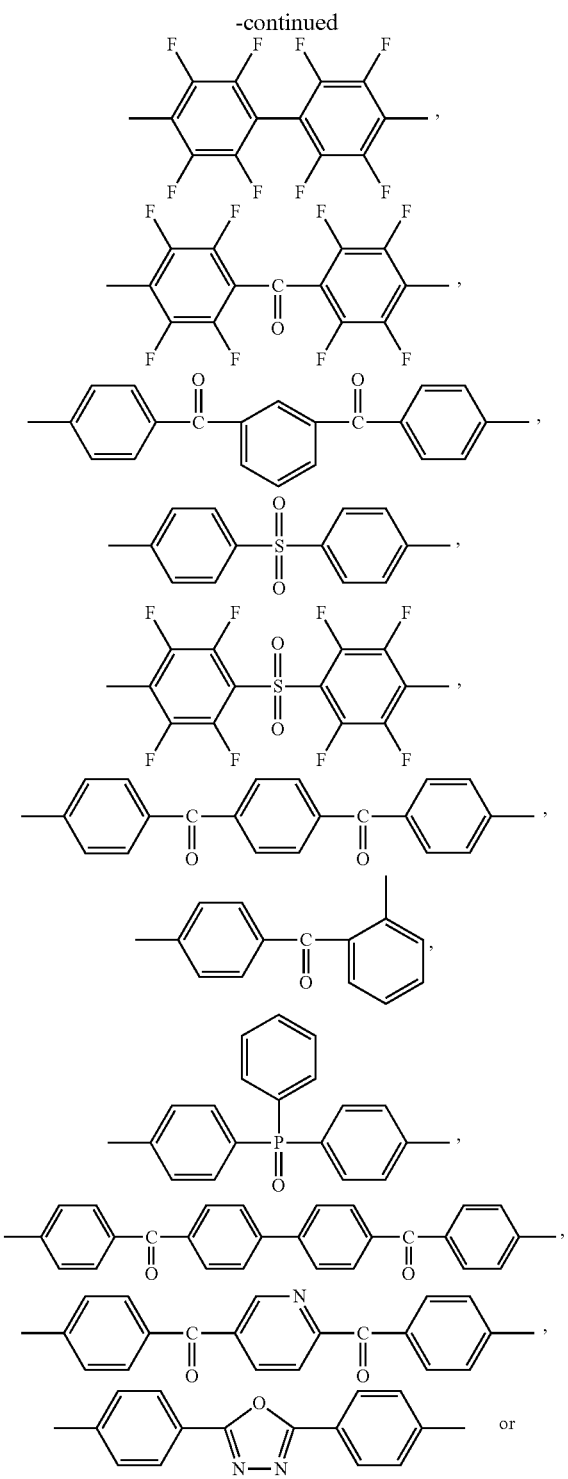

-continued

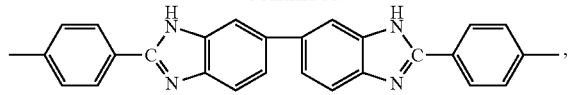

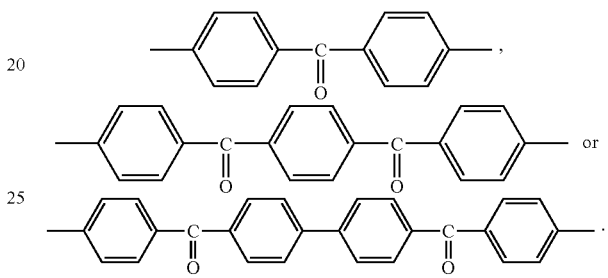

n is a non-zero integer from 0 to 10,000, p is 1 or 2, and R is hydrogen or a ring-activating organic moiety, wherein the ring activating organic moiety may be the same or different and is a substituted or unsubstituted $C_1$-$C_8$ alkyl, $C_6$-$C_{18}$ aryl, $C_7$-$C_{26}$ aralkyl, $C_7$-$C_{26}$ alkaryl, $C_1$-$C_8$ alkoxy or $C_6$-$C_{18}$ aryloxy group, the substituted organic moiety being substituted by one or more amine, amide or hydroxyl groups.

2. The sulfonated poly(aryl ether) according to claim 1, wherein X is

3. The sulfonated poly(aryl ether) according to claim 1, wherein the organic moiety is an unsubstituted $C_1$-$C_8$ alkyl group, an aryloxy group or an aryl group.

4. The sulfonated poly(aryl ether) according to claim 1, wherein the organic moiety is methyl, ethyl, n-propyl, i-propyl, n-butyl, s-butyl, t-butyl, phenyl, methoxy or phenoxy.

5. The sulfonated poly(aryl ether) according to claim 1, wherein R is H, methyl or phenoxy.

6. The sulfonated poly(aryl ether) according to claim 1, wherein R is phenyl.

7. The sulfonated poly(aryl ether) according to claim 1 having a number average molecular weight in a range of from about 5,000 to about 500,000.

8. The sulfonated poly(aryl ether) according to claim 2, wherein the organic moiety is an unsubstituted $C_1$-$C_8$ alkyl group, an aryloxy group or an aryl group.

9. The sulfonated poly(aryl ether) according to claim 2, wherein the organic moiety is methyl, ethyl, n-propyl, i-propyl, n-butyl, s-butyl, t-butyl, phenyl, methoxy or phenoxy.

10. The sulfonated poly(aryl ether) according to claim 2, wherein R is H, methyl or phenoxy.

11. The sulfonated poly(aryl ether) according to claim 2, wherein R is phenyl.

12. The sulfonated poly(aryl ether) according to claim 2 having a number average molecular weight in a range of from about 5,000 to about 500,000.

* * * * *